US012551298B2

(12) United States Patent
Liu et al.

(10) Patent No.: US 12,551,298 B2
(45) Date of Patent: Feb. 17, 2026

(54) SYSTEMS AND METHODS FOR IDENTIFYING AND FACILITATING AN INTENDED INTERACTION WITH A TARGET OBJECT IN A SURGICAL SPACE

(71) Applicant: Intuitive Surgical Operations, Inc., Sunnyvale, CA (US)

(72) Inventors: Wen Pei Liu, San Jose, CA (US); Maximilian H. Allan, San Francisco, CA (US); Mahdi Azizian, San Jose, CA (US); Azad Shademan, Campbell, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 689 days.

(21) Appl. No.: 17/785,189

(22) PCT Filed: Dec. 14, 2020

(86) PCT No.: PCT/US2020/064923
§ 371 (c)(1),
(2) Date: Jun. 14, 2022

(87) PCT Pub. No.: WO2021/126786
PCT Pub. Date: Jun. 24, 2021

(65) Prior Publication Data
US 2022/0409301 A1 Dec. 29, 2022

Related U.S. Application Data

(60) Provisional application No. 62/986,373, filed on Mar. 6, 2020, provisional application No. 62/959,635, filed
(Continued)

(51) Int. Cl.
*A61B 34/00* (2016.01)
*A61B 17/00* (2006.01)
(Continued)

(52) U.S. Cl.
CPC .............. *A61B 34/25* (2016.02); *A61B 17/00* (2013.01); *A61B 34/32* (2016.02); *A61B 34/35* (2016.02);
(Continued)

(58) Field of Classification Search
CPC ......... A61B 34/25; A61B 34/32; A61B 34/35; A61B 34/76; A61B 90/37; A61B 17/00;
(Continued)

(56) References Cited

U.S. PATENT DOCUMENTS 9,743,989 B2 * 8/2017 Itkowitz ................. A61B 34/35
9,767,608 B2 * 9/2017 Lee ......................... G16H 40/63
(Continued)

FOREIGN PATENT DOCUMENTS

CN 105455901 A 4/2016
EP 3114997 A1 1/2017
(Continued)

OTHER PUBLICATIONS

International Search Report and Written Opinion for Application No. PCT/US2020/064923, mailed Mar. 31, 2021, 15 pages.
(Continued)

*Primary Examiner* — Shirley X Jian

(57) ABSTRACT

An exemplary system includes a memory storing instructions and a processor communicatively coupled to the memory. The processor may be configured to execute the instructions to: detect an intent of a user of a computer-assisted surgical system to use a robotic instrument attached to the computer-assisted surgical system to interact with a target object while the target object is located in a surgical space; determine a pose of the target object in the surgical space; and perform, based on the detected intent of the user
(Continued)

to interact with the target object and the determined pose of the target object in the surgical space, an operation with respect to the target object.

19 Claims, 21 Drawing Sheets

Related U.S. Application Data on Jan. 10, 2020, provisional application No. 62/948,542, filed on Dec. 16, 2019.

(51) Int. Cl.
*A61B 34/32* (2016.01)
*A61B 34/35* (2016.01)
*A61B 90/00* (2016.01)
A61B 34/10 (2016.01)
A61B 34/20 (2016.01)

(52) U.S. Cl.
CPC .............. *A61B 34/76* (2016.02); *A61B 90/37* (2016.02); *A61B 2017/00115* (2013.01); *A61B 2017/00207* (2013.01); *A61B 2017/00216* (2013.01); *A61B 2034/105* (2016.02); *A61B 2034/107* (2016.02); *A61B 2034/2065* (2016.02); *A61B 2034/2068* (2016.02); *A61B 2034/252* (2016.02); *A61B 2090/366* (2016.02)

(58) Field of Classification Search
CPC ........ A61B 2034/105; A61B 2034/107; A61B 2034/2065; A61B 2034/2068; A61B 2034/252; A61B 2090/366; A61B 2017/00115; A61B 2017/00207; A61B 2017/00216
See application file for complete search history.

(56) References Cited

U.S. PATENT DOCUMENTS

| | | | |
|---|---|---|---|
| 10,543,050 B2 * | 1/2020 | Itkowitz | A61B 34/30 |
| 10,987,022 B2 * | 4/2021 | Coste-Maniere | A61B 5/749 |
| 11,166,770 B2 * | 11/2021 | DiMaio | A61B 90/03 |
| 11,707,336 B2 * | 7/2023 | Itkowitz | A61B 34/30 |
| | | | 606/130 |
| 2012/0071891 A1 | 3/2012 | Itkowitz et al. | |
| 2016/0220316 A1 * | 8/2016 | Daon | A61B 34/25 |
| 2017/0189125 A1 * | 7/2017 | Malackowski | A61B 34/20 |
| 2018/0199999 A1 | 7/2018 | Syverson et al. | |
| 2018/0361585 A1 * | 12/2018 | Williams | A47L 11/14 |
| 2019/0159699 A1 * | 5/2019 | Coste-Maniere | G06T 7/60 |
| 2019/0216555 A1 * | 7/2019 | DiMaio | B25J 9/126 |
| 2019/0290370 A1 * | 9/2019 | Brummund | A61B 90/13 |
| 2020/0015910 A1 * | 1/2020 | Azizian | A61B 34/20 |
| 2021/0369365 A1 * | 12/2021 | Goswami | A61B 90/37 |
| 2022/0022980 A1 * | 1/2022 | DiMaio | B25J 9/1664 |
| 2023/0112592 A1 * | 4/2023 | Shademan | A61B 34/37 |
| | | | 606/1 |
| 2023/0126545 A1 * | 4/2023 | Liu | A61B 8/08 |
| | | | 382/128 |

FOREIGN PATENT DOCUMENTS

| | | |
|---|---|---|
| WO | WO-2013164770 A2 | 11/2013 |
| WO | WO-2018152183 A1 | 8/2018 |
| WO | WO-2019210322 A1 | 10/2019 |

OTHER PUBLICATIONS

Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.
International Preliminary Report on Patentability for Application No. PCT/US2020/064923, mailed on Jun. 30, 2022, 12 pages.

* cited by examiner

SYSTEMS AND METHODS FOR IDENTIFYING AND FACILITATING AN INTENDED INTERACTION WITH A TARGET OBJECT IN A SURGICAL SPACE

RELATED APPLICATIONS

The present application is a U.S. National Stage Application under 35 U.S.C. § 371 of International Application No. PCT/US2020/064923, filed on Dec. 14, 2020, which claims priority to U.S. Provisional Patent Application No. 62/948,542, filed on Dec. 16, 2019, U.S. Provisional Patent Application No. 62/959,635, filed on Jan. 10, 2020, and to U.S. Provisional Patent Application No. 62/986,373, filed on Mar. 6, 2020, the contents of which are hereby incorporated by reference in their entirety.

BACKGROUND INFORMATION

A computer-assisted surgical system that employs robotic and/or teleoperation technology typically includes a stereoscopic image viewer configured to provide, for display to a surgeon, imagery of a surgical space as captured by an imaging device such as an endoscope. While the surgeon's eyes are positioned in front of viewing lenses of the stereoscopic image viewer, the surgeon may view the imagery of the surgical space while remotely manipulating one or more surgical instruments located within the surgical space. The surgical instruments are attached to one or more manipulator arms of a surgical instrument manipulating system included as part of the computer-assisted surgical system.

In addition to the surgical instruments that are attached to the one or more manipulator arms, additional instruments may be inserted into the surgical space to facilitate the surgeon performing procedures within the surgical space. For example, sub-surface sensing devices (e.g., ultrasound devices) may be provided within the surgical space to improve the surgeon's perception of the surgical space and improve an outcome of a procedure. However, such additional instruments are not typically integrated into a module that attaches to a manipulator arm of a computer-assisted surgical system. In view of this, such additional instruments may only be available as drop-in instruments that rely on, for example, a grasper surgical instrument attached to a manipulator arm of a computer-assisted surgical system to grasp and move the drop-in instruments within the surgical space. Operation of a teleoperated grasper surgical instrument to interact with a drop-in instrument requires a surgeon to perform complex maneuvers to pick up and position the drop-in instrument at a desired location within the surgical space.

SUMMARY

An exemplary system comprises a memory storing instructions; and a processor communicatively coupled to the memory and configured to execute the instructions to: detect an intent of a user of a computer-assisted surgical system to use a robotic instrument attached to the computer-assisted surgical system to interact with the a target object while the target object is located in a surgical space; determine a pose of the target object in the surgical space; and perform, based on the detected intent of the user to interact with the target object and the determined pose of the target object in the surgical space, an operation with respect to the target object.

An additional exemplary system comprises a memory storing instructions; and a processor communicatively coupled to the memory and configured to execute the instructions to: determine that a non-robotic instrument is located in a surgical space; determine, in response to determining that the non-robotic instrument is located in the surgical space, a pose of the non-robotic instrument in the surgical space; and facilitate, based on the determined pose of the non-robotic instrument in the surgical space, a robotic instrument, which is attached to a computer-assisted surgical system, interacting with the non-robotic instrument.

An exemplary method comprises detecting, by a processor associated with a computer-assisted surgical system, an intent of a user of the computer-assisted surgical system to use a robotic instrument attached to the computer-assisted surgical system to interact with a target object while the target object is located in a surgical space; determining, by the processor, a pose of the target object in the surgical space; and performing, by the processor based on the detected intent of the user to interact with the target object and the determined pose of the target object in the surgical space, an operation with respect to the target object.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
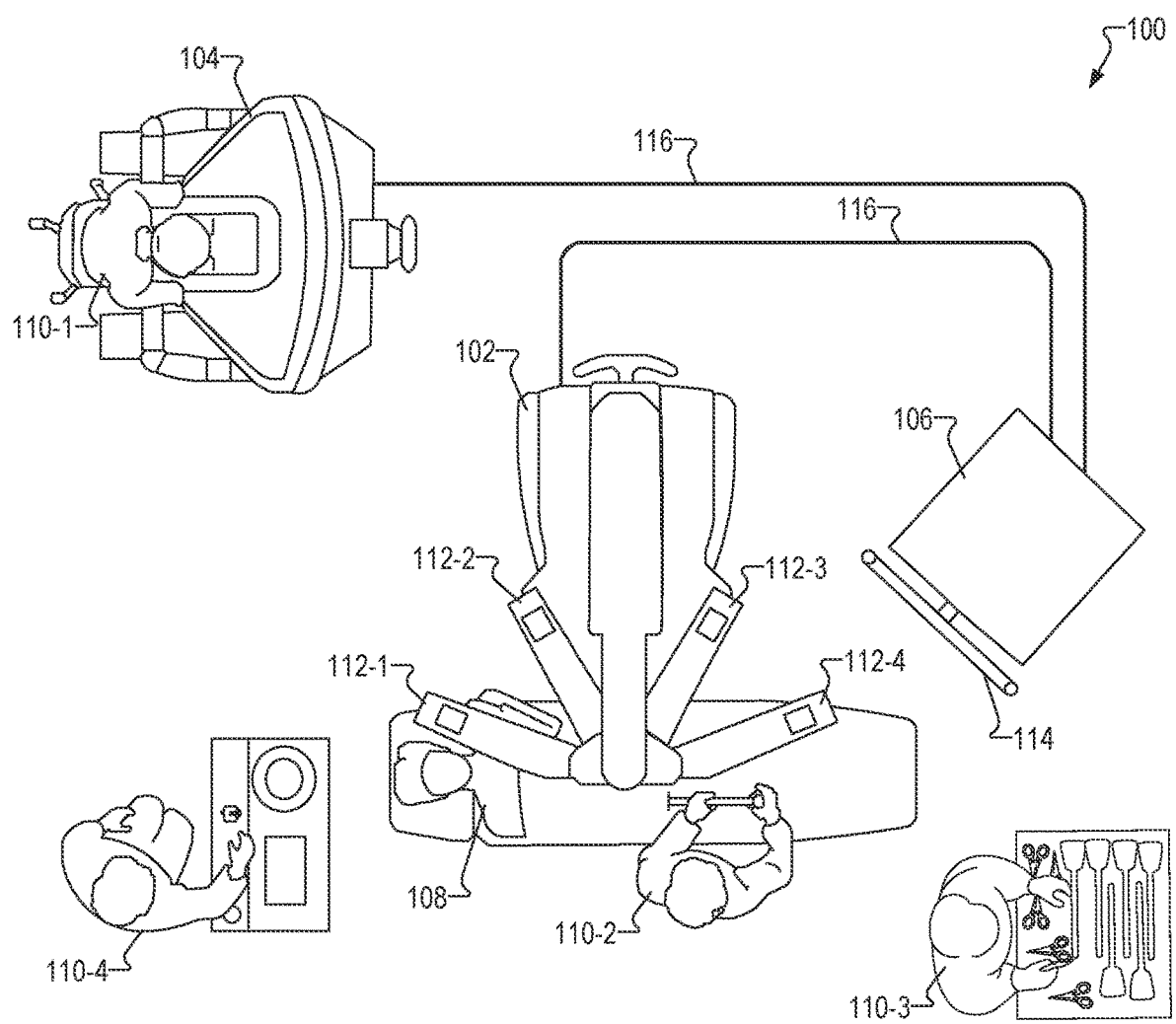
FIG. 1 illustrates an exemplary computer-assisted surgical system according to principles described herein.

Systems and methods for identifying and facilitating an intended interaction with a target object in a surgical space are described herein. As will be described in more detail below, an exemplary system includes a memory that stores instructions and a processor communicatively connected to the memory. The processor of the exemplary system is configured to execute the instructions to detect an intent of a user of a computer-assisted surgical system to use a robotic instrument attached to the computer-assisted surgical system to interact with a target object while the target object is located in a surgical space, determine a pose of the target object in the surgical space, and perform, based on the detected intent of the user to interact with the target object and the determined pose of the target object in the surgical space, an operation with respect to the target object.

Various advantages and benefits are associated with systems and methods described herein. For example, systems and methods such as those described herein may reduce the mental and/or physical workload required for a user of a computer-assisted surgical system (e.g., a surgeon and/or another user associated with a computer-assisted surgical system) to interact with and/or use a target object located in a surgical space, such as by facilitating an initiation of an interaction with the target object. In so doing, systems and methods such as those described herein may simplify procedures performed within the surgical space and/or improve usability of a computer-assisted surgical system. These and other benefits that may be realized by the systems and methods described herein will be evident from the disclosure that follows.

Exemplary systems described herein may be configured to operate as part of or in conjunction with a plurality of different types of computer-assisted surgical systems. The plurality of different types of computer-assisted surgical systems may be of different types at least because they include different types of surgical instrument manipulating systems. For example, a first computer-assisted surgical system may include a first type of surgical instrument manipulating system, a second computer-assisted surgical system may include a second type of surgical instrument manipulating system, and a third computer-assisted surgical system may include a third type of surgical instrument manipulating system.

Each type of surgical instrument manipulating system may have a different architecture (e.g., a manipulator arm architecture), have a different kinematic profile, and/or operate according to different configuration parameters. An exemplary computer-assisted surgical system with a first type of surgical instrument manipulating system will now be described with reference to FIG. 1. The described exemplary computer-assisted surgical system is illustrative and not limiting. Systems such as those described herein may operate as part of or in conjunction with the described computer-assisted surgical system and/or any other suitable computer-assisted surgical system.

FIG. 1 illustrates an exemplary computer-assisted surgical system 100 ("surgical system 100"). As shown, surgical system 100 may include a surgical instrument manipulating system 102 ("manipulating system 102"), a user control system 104, and an auxiliary system 106 communicatively coupled one to another.

Surgical system 100 may be utilized by a surgical team to perform a computer-assisted surgical procedure on a patient 108. As shown, the surgical team may include a surgeon 110-1, an assistant 110-2, a nurse 110-3, and an anesthesiologist 110-4, all of whom may be collectively referred to as "surgical team members 110." Additional or alternative surgical team members may be present during a surgical session as may serve a particular implementation.

While FIG. 1 illustrates an ongoing minimally invasive surgical procedure, surgical system 100 may similarly be used to perform open surgical procedures or other types of surgical procedures that may similarly benefit from the accuracy and convenience of surgical system 100. Additionally, it will be understood that the surgical session throughout which surgical system 100 may be employed may not only include an operative phase of a surgical procedure, as is illustrated in FIG. 1, but may also include preoperative, postoperative, and/or other suitable phases of the surgical procedure. A surgical procedure may include any procedure in which manual and/or instrumental techniques (e.g., teleoperated instrumental techniques) are used on a patient to investigate, diagnose, or treat a physical condition of the patient. Additionally, a surgical procedure may include any procedure that is not performed on a live patient, such as a calibration procedure, a simulated training procedure, and an experimental or research procedure.

As shown in FIG. 1, surgical instrument manipulating system 102 may include a plurality of manipulator arms 112 (e.g., manipulator arms 112-1 through 112-4) to which a plurality of robotic surgical instruments ("robotic instruments") (not shown) may be coupled. As used herein, a "robotic instrument" refers to any instrument that may be directly attached to (e.g., plugged into) a manipulator arm (e.g., manipulator arm 112-1) such that movement of the manipulator arm directly causes movement of the instrument. Each robotic instrument may be implemented by any suitable therapeutic instrument (e.g., a tool having tissue-interaction functions), imaging device (e.g., an endoscope), diagnostic instrument, or the like that may be used for a computer-assisted surgical procedure (e.g., by being at least partially inserted into patient 108 and manipulated to perform a computer-assisted surgical procedure on patient 108). In some examples, one or more of the robotic instruments may include force-sensing and/or other sensing capabilities.

In the example shown in FIG. 1, manipulator arms 112 of manipulating system 102 are attached on a distal end of an overhead boom that extends horizontally. However, manipulator arms 112 may have other configurations in certain implementations. In addition, while manipulating system 102 is depicted and described herein as including four manipulator arms 112, it will be recognized that manipulating system 102 may include only a single manipulator arm 112 or any other number of manipulator arms as may serve a particular implementation.

Manipulator arms 112 and/or robotic instruments attached to manipulator arms 112 may include one or more displacement transducers, orientational sensors, and/or positional sensors (hereinafter "surgical system sensors") used to generate raw (e.g., uncorrected) kinematics information. One or more components of surgical system 100 may be configured to use the kinematics information to track (e.g.; determine positions of) and/or control the robotic instruments.

In addition, manipulator arms 112 may each include or otherwise be associated with a plurality of motors that control movement of manipulator arms 112 and/or the surgical instruments attached thereto. For example, manipulator arm 112-1 may include or otherwise be associated with a first internal motor (not explicitly shown) configured to yaw manipulator arm 112-1 about a yaw axis. In like manner, manipulator arm 112-1 may be associated with a second internal motor (not explicitly shown) configured to drive and pitch manipulator arm 112-1 about a pitch axis. Likewise, manipulator arm 112-1 may be associated with a third internal motor (not explicitly shown) configured to slide manipulator arm 112-1 along insertion axis. Manipulator arms 112 may each include a drive train system driven by one or more of these motors in order to control the pivoting of manipulator arms 112 in any manner as may serve a particular implementation. As such, if a robotic instrument attached, for example, to manipulator arm 112-1 is to be mechanically moved, one or more of the motors coupled to the drive train may be energized to move manipulator arm 112-1.

Robotic instruments attached to manipulator arms 112 may each be positioned in a surgical space. A "surgical space" may, in certain examples, be entirely disposed within a patient and may include an area within the patient at or near where a surgical procedure is planned to be performed, is being performed, or has been performed. For example, for a minimally invasive surgical procedure being performed on tissue internal to a patient, the surgical space may include the tissue, anatomy underlying the tissue, as well as space around the tissue where, for example, robotic instruments and/or other instruments being used to perform the surgical procedure are located. In other examples, a surgical space may be at least partially disposed external to the patient at or near where a surgical procedure is planned to be performed, is being performed, or has been performed on the patient. For instance, surgical system 100 may be used to perform an open surgical procedure such that part of the surgical space (e.g., tissue being operated on) is internal to the patient while another part of the surgical space (e.g., a space around the tissue where one or more instruments may be disposed) is external to the patient. A robotic instrument may be referred to as being positioned or located at or within a surgical space when at least a portion of the robotic instrument (e.g., a distal portion of the robotic instrument) is located within the surgical space. Exemplary surgical spaces and/or images of surgical spaces will be described herein.

User control system 104 may be configured to facilitate control by surgeon 110-1 of manipulator arms 112 and robotic instruments attached to manipulator arms 112. For example, surgeon 110-1 may interact with user control system 104 to remotely move or manipulate manipulator arms 112 and the robotic instruments. To this end, user control system 104 may provide surgeon 110-1 with imagery (e.g., high-definition three-dimensional (3D) imagery) of a surgical space associated with patient 108 as captured by an imaging device. In certain examples, user control system 104 may include a stereoscopic image viewer having two displays where stereoscopic images (e.g., 3D images) of a surgical space associated with patient 108 and generated by a stereoscopic imaging system may be viewed by surgeon 110-1. Surgeon 110-1 may utilize the imagery to perform one or more procedures with one or more robotic instruments attached to manipulator arms 112.

To facilitate control of robotic instruments, user control system 104 may include a set of master controls (not shown). These master controls may be manipulated by surgeon 110-1 to control movement of robotic instruments (e.g., by utilizing robotic and/or teleoperation technology). The master controls may be configured to detect a wide variety of hand, wrist, and finger movements by surgeon 110-1. In this manner, surgeon 110-1 may intuitively perform a surgical procedure using one or more robotic instruments.

User control system 104 may further be configured to facilitate control by surgeon 110-1 of other components of surgical system 100. For example, surgeon 110-1 may interact with user control system 104 to change a configuration or operating mode of surgical system 100, to change a display mode of surgical system 100, to generate additional control signals used to control surgical instruments attached to manipulator arms 112, to facilitate switching control from one robotic instrument to another, to facilitate interaction with other instruments and/or objects within the surgical space, or to perform any other suitable operation. To this end, user control system 104 may also include one or more input devices (e.g., foot pedals, buttons, switches, etc.) configured to receive input from surgeon 110-1.

Auxiliary system 106 may include one or more computing devices configured to perform primary processing operations of surgical system 100. The one or more computing devices included in auxiliary system 106 may control and/or coordinate operations performed by various other components (e.g., manipulating system 102 and/or user control system 104) of surgical system 100. For example, a computing device included in user control system 104 may transmit instructions to manipulating system 102 by way of the one or more computing devices included in auxiliary system 106. As another example, auxiliary system 106 may receive, from manipulating system 102, and process image data representative of imagery captured by an imaging device attached to one of manipulator arms 112.

In some examples, auxiliary system 106 may be configured to present visual content to surgical team members 110 who may not have access to the images provided to surgeon 110-1 at user control system 104. To this end, auxiliary system 106 may include a display monitor 114 configured to display one or more user interfaces, such as images (e.g., 2D images) of the surgical space, information associated with patient 108 and/or the surgical procedure, and/or any other visual content as may serve a particular implementation. For example, display monitor 114 may display images of the surgical space together with additional content (e.g., representations of target objects, graphical content, contextual information, etc.) concurrently displayed with the images. In some embodiments, display monitor 114 is implemented by a touchscreen display with which surgical team members 110 may interact (e.g., by way of touch gestures) to provide user input to surgical system 100.

Manipulating system 102, user control system 104, and auxiliary system 106 may be communicatively coupled one to another in any suitable manner. For example, as shown in FIG. 1, manipulating system 102, user control system 104, and auxiliary system 106 may be communicatively coupled by way of control lines 116, which may represent any wired or wireless communication link as may serve a particular implementation. To this end, manipulating system 102, user control system 104, and auxiliary system 106 may each include one or more wired or wireless communication interfaces, such as one or more local area network interfaces, Wi-Fi network interfaces, cellular interfaces, etc.

Figure 2:
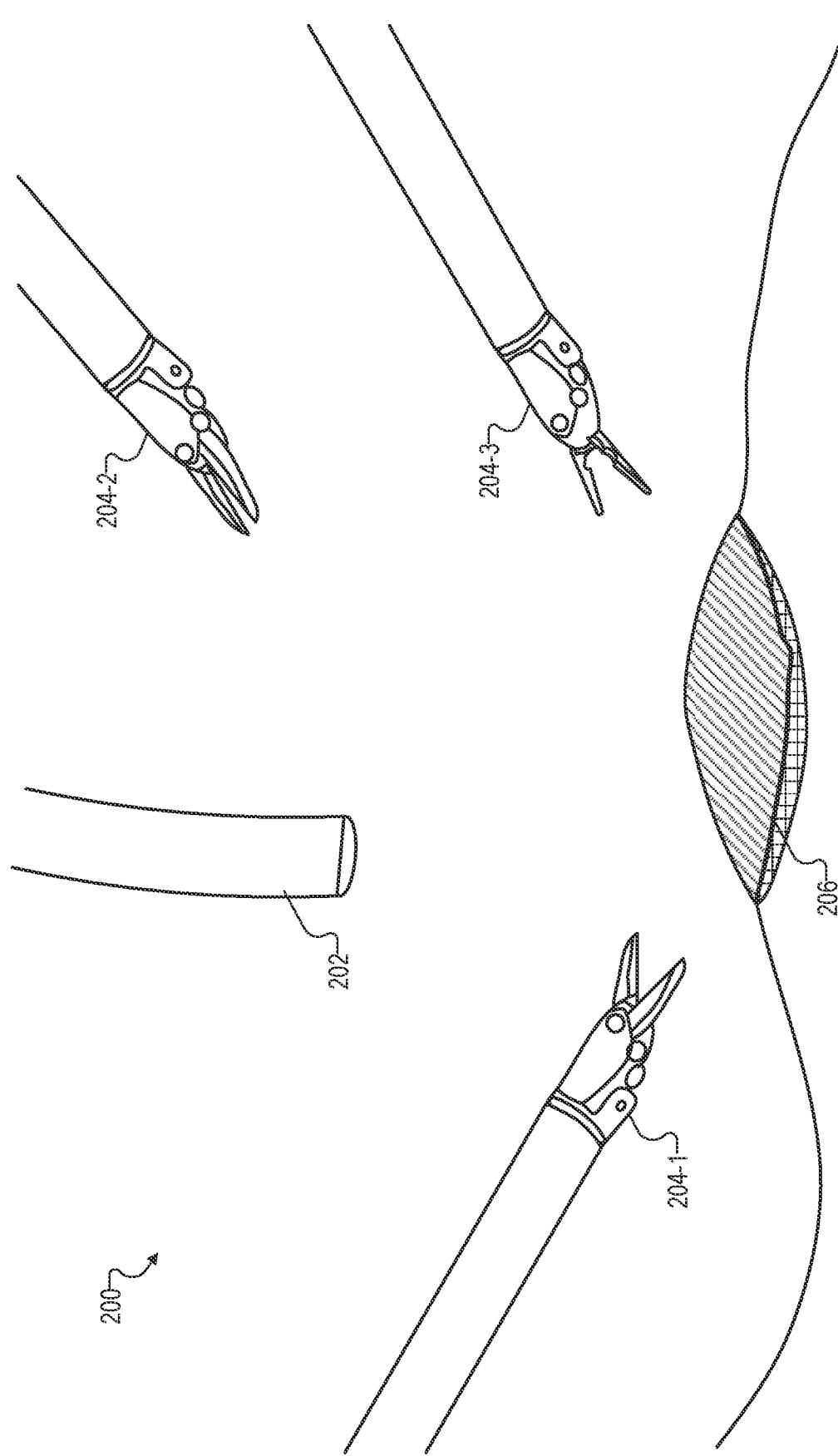
FIG. 2 illustrates an exemplary view of a surgical space according to principles described herein.

FIG. 2 illustrates a view 200 of a surgical space in which various robotic instruments that are attached to manipulator arms 112 of surgical system 100 are provided. As shown, the robotic instruments may include an imaging device 202 and one or more other robotic instruments 204 (e.g., robotic instruments 204-1 through 204-3) in the form of one or more surgical tools. While FIG. 2 shows one imaging device 202 and three other robotic instruments 204 located at the surgical space, any number, type, and/or combination of robotic instruments may be at the surgical space during a surgical procedure. In the example shown in FIG. 2, robotic instruments 204-1 and 204-2 are shown as cutting-type robotic instruments whereas robotic instrument 204-3 is shown as a grasping-type robotic instrument. It is understood that other types of robotic instruments (e.g., diagnostic tools, therapeutic tools, etc.) different than those shown in FIG. 2 may additionally or alternatively be provided within the surgical space during the surgical procedure in certain implementations. Tissue 206 represents anatomical tissue at the surgical space.

Imaging device 202 may capture imagery at the surgical space. Any of robotic instruments 204 and/or tissue 206 that are within a field of view of imaging device 202 may be depicted in the imagery captured by imaging device 202.

Imaging device 202 may provide data representing visible light data of a surgical space. For example, imaging device 202 may capture visible light images of the surgical space that represent visible light sensed by imaging device 202. Visible light images may include images that use any suitable color and/or grayscale palette to represent a visible light-based view of the surgical space.

Imaging device 202 may also provide data representing depth data of a surgical space or data that may be processed to derive depth data of the surgical space. For example, imaging device 202 may capture images of the surgical space that represent depth sensed by imaging device 202. Alternatively, imaging device 202 may capture images of the surgical space that may be processed to derive depth data of the surgical space. The depth information may be represented as depth images (e.g., depth map images obtained using a Z-buffer that indicates distance from imaging device 202 to each pixel point on an image of a surgical space), which may be configured to visually indicate depths of objects in the surgical space in any suitable way, such as by using different greyscale values to represent different depth values. Images captured by an imaging device (e.g., by imaging device 202) and/or derived from images captured by the imaging device (e.g., visible light images and depth images) may be used to facilitate detecting a target object within a surgical space, such as described herein.

During a surgical procedure, it may be desirable to detect a target object located within a surgical space. As used herein, a "target object" may refer to any object that may be located in a surgical space. For example, a target object may correspond to anatomy (e.g., tissue, bone, etc.) within the surgical space, a robotic instrument located within the surgical space, or any other object or instrument that may be located in a surgical space. In certain examples, a target object may correspond to a non-robotic instrument that may be located in a surgical space. As used herein, a "non-robotic instrument" refers to any suitable instrument that may be provided within a surgical space but that is not directly attached to one of manipulator arms 112. As such, a non-robotic instrument may only movable within a surgical space by either being manually manipulated by a user (e.g., surgeon 110-1, assistant 110-2, etc.) or by being moved by a robotic instrument directly attached to one of manipulator arms (e.g., by being grasped by robotic instrument 204-3). In this regard, a non-robotic instrument may be referred to as a drop-in surgical instrument. Examples of non-robotic instruments may include, but are not limited to, a drop-in ultrasound probe, a drop-in optical coherence tomography ("OCT") probe, a drop-in rapid evaporative ionization mass spectrometry ("REIMS") device, a suture needle, etc.

Figure 3:
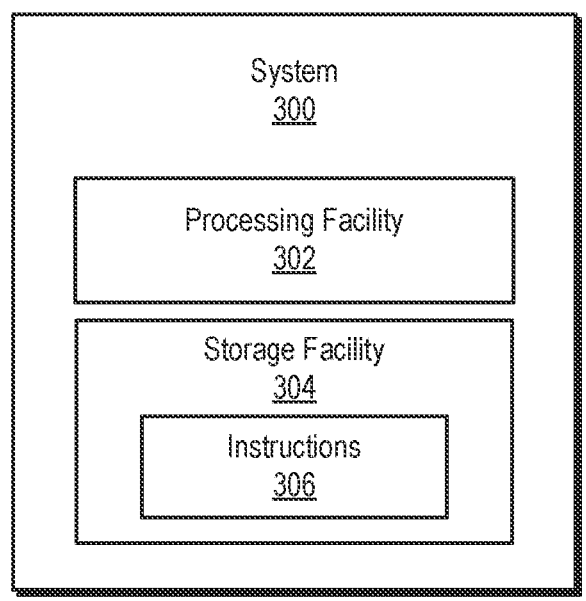
FIG. 3 illustrates an exemplary system configured to perform various operations according to principles described herein.

FIG. 3 illustrates an exemplary system 300 that may be implemented according to principles described herein to identify and facilitate an intended interaction with a target object in a surgical space. As shown, system 300 may include, without limitation, a processing facility 302 and a storage facility 304 selectively and communicatively coupled to one another. Facilities 302 and 304 may each include or be implemented by hardware and/or software components (e.g., processors, memories, communication interfaces, instructions stored in memory for execution by the processors, etc.). In some examples, facilities 302 and 304 may be implemented by a single device (e.g., a single computing device). In certain alternate examples, facilities 302 and 304 may be distributed between multiple devices and/or multiple locations as may serve a particular implementation.

Storage facility 304 may maintain (e.g., store) executable data used by processing facility 302 to perform any of the operations described herein. For example, storage facility 304 may store instructions 306 that may be executed by processing facility 302 to perform any of the operations described herein. Instructions 306 may be implemented by any suitable application, software, code, and/or other executable data instance.

Storage facility 304 may also maintain any data received, generated, managed, used, and/or transmitted by processing facility 302. For example, storage facility 304 may maintain any suitable data associated with detecting a target object located in a surgical space and/or facilitating interaction with the target object. Such data may include, but is not limited to, data associated with representations of known target objects (e.g., known non-robotic instruments), 3D models of one or more target objects, data defining voice-based commands, data defining gesture-based commands, graphical objects, notifications, and/or any other suitable data.

Processing facility 302 may be configured to perform (e.g., execute instructions 306 stored in storage facility 304) various processing operations associated with identifying and facilitating an intended interaction with a target object. For example, processing facility 302 may detect an intent of a user of a computer-assisted surgical system to use a robotic instrument attached to the computer-assisted surgical system to interact with a target object while the target object is located in a surgical space; determine a pose of the target object in the surgical space; and perform, based on the detected intent of the user to interact with the target object and the determined pose of the target object in the surgical space, an operation with respect to the target object. These and other operations that may be performed by processing facility 302 are described herein.

At any given time during a surgical procedure associated with a surgical space, it may be desirable for a user of a computer-assisted surgical system to interact with and/or use a target object that is either located within the surgical space or that may be inserted within the surgical space. To facilitate interaction with and/or use of such a target object, system 300 (e.g., processing facility 302) may be configured, in certain examples, to determine whether a target object is located in a surgical space. System 300 may determine whether a target object is located in a surgical space in any suitable manner. For example, in certain implementations, system 300 may use vision-based image processing techniques (e.g., computer vision techniques) to determine whether a target object is located in a surgical space. In such examples, system 300 may be configured to use any suitable vision-based image processing technique to track and identify one or more objects and/or types of objects (e.g., robotic instruments, non-robotic instruments, tissue, etc.) within a surgical space. Such vision-based image processing techniques may include system 300 using imaging device 202 to capture imagery (e.g., one or more images) of the surgical space. System 300 may use the captured imagery as input for the vision-based image processing techniques to determine information associated with the objects in the surgical space. For example, system 300 may use the captured imagery to determine, in any suitable manner, whether a target object is located in the surgical space. In addition, system 300 may use the captured imagery and any suitable vision-based image processing technique to determine the size, the shape, the pose, and/or the number of objects located in the surgical space. In certain examples, any object in the surgical space other than a robotic instrument may be considered as a candidate for being identified as a target object located in the surgical space.

Additionally or alternatively, system 300 may be configured to determine whether a target object is located in a surgical space based on a depth map of the surgical space. System 300 may be configured to use a depth map in any suitable manner. For example, system 300 may detect a difference between a current depth map of the surgical space and one or more previous depth maps of the surgical space. Based on the detected difference, system 300 may identify known object shapes, known patterns of object shapes (e.g., insertion patterns), and/or any other suitable information that may be indicative of a target object that is either located in a surgical space and/or that is in the process of being inserted in the surgical space. System 300 may use any suitable number of depth maps to determine whether a target object is located in a surgical space as may serve a particular implementation. In certain examples, system 300 may compare a sequence of previous-frame depth maps to a current-frame depth map to determine whether a target object is located in a surgical space. In certain examples, system 300 may be configured to continually monitor a depth map of a surgical space to determine in real time whether a target object is located in a surgical space.

Figure 4:
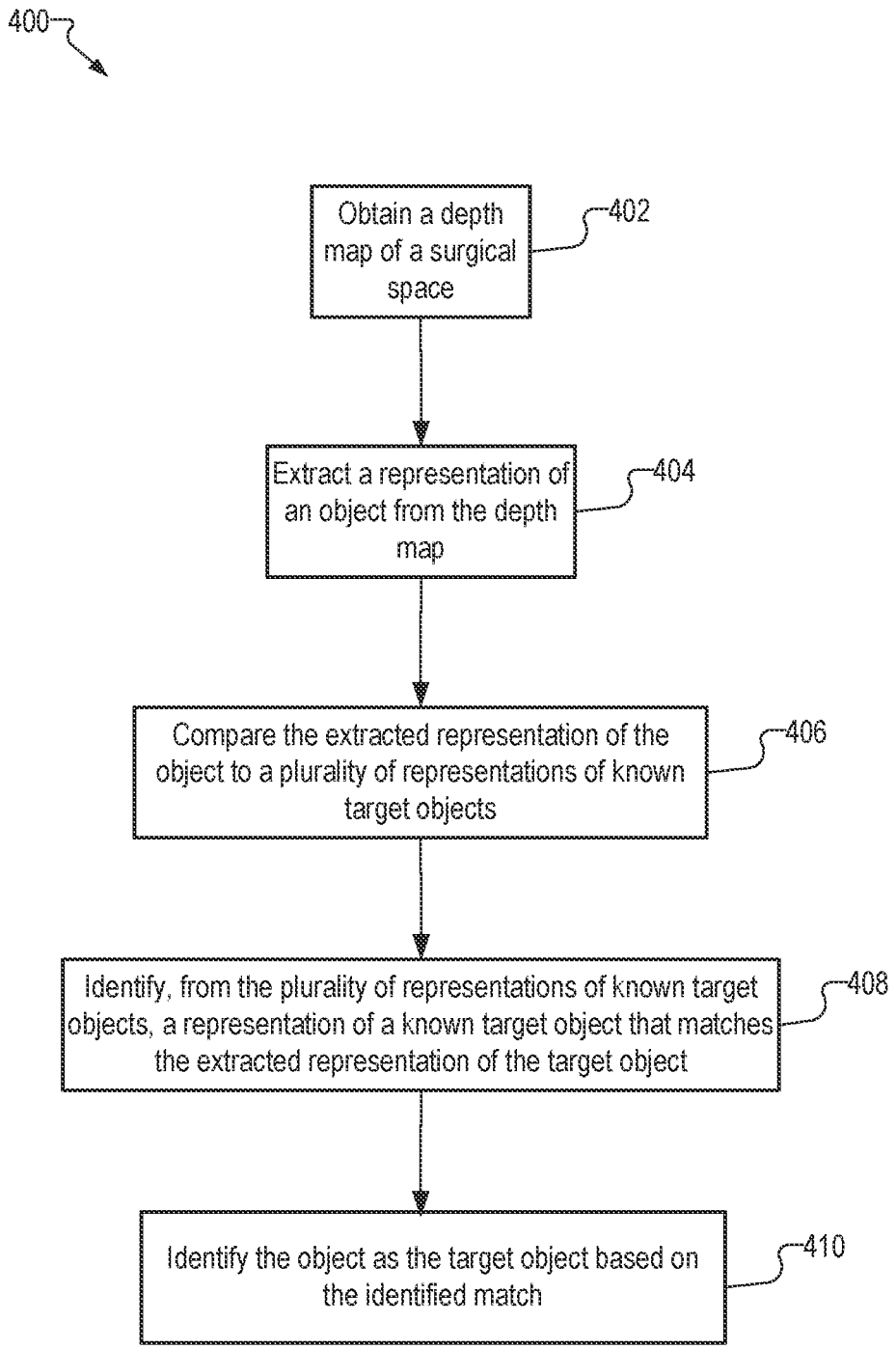
FIGS. 4-6 illustrate exemplary flow charts depicting various operations that may be performed by the system illustrated in FIG. 3 according to principles described herein.

FIG. 4 shows a flow chart 400 that depicts exemplary operations that may be performed by system 300 when using a depth map to determine whether a target object is located in a surgical space. As shown in FIG. 4, in operation 402, system 300 may obtain a depth map of a surgical space. System 300 may obtain the depth map of the surgical space in any suitable manner. For example, system 300 may use imaging device 202 to capture depth data, which system 300 may then use to generate a depth map of the surgical space in any suitable manner. Alternatively, system 300 may receive the depth map from any suitable source.

In operation 404, system 300 may extract a representation of an object from the depth map. A representation of an object may have any suitable format as may serve a particular implementation. For example, a representation of an object may correspond to a surface contour of an object, a volumetric reconstruction of an object (e.g., a point cloud of the object), an outer contour shape of an object, etc. System 300 may extract the representation of the object from the generated depth map in any suitable manner. For example, system 300 may subtract a previous depth map of the surgical space from the current depth map of the surgical space that includes the object. The depth map data that remains after such a subtraction may be representative of the object in the surgical space. As another example, system 300 may segment the depth map by classifying points in the depth map as being associated with particular objects or types of objects. Points that are labeled as corresponding to the object may be extracted as a representation of the object.

In operation 406, system 300 may compare the extracted representation of the object to a plurality of representations of known target objects. This may be accomplished in any suitable manner. For example, system 300 may access data representative of the plurality of known target objects from storage facility 104. System 300 may then compare the extracted representation to at least some of the representations included in the plurality of representations of known target objects. Based on the comparison, system 300 may use any suitable image processing technique to determine a degree of similarity between the extracted representation and at least some of the representations included in the plurality of representations of known target objects. In certain examples, system 300 may compare the extracted representation to each of the representations included in the plurality of representations of known target objects.

In operation 408, system 300 may identify, from the plurality of representations of known target objects, a representation of a known target object that matches the extracted representation of the object. System 300 may determine whether there is a match between the extracted representation of the object and a representation of a known target object in any suitable manner. For example, system 300 may determine that there is a match when a degree of similarity between the extracted representation and a representation of a known target object is above a predefined threshold amount. To illustrate, system 300 may determine that there is a match if the degree of similarity between the extracted representation and the representation of the known target object is above 95%. Such a percentage degree of similarity may be determined in any suitable manner.

In certain alternative implementations, system 300 may use image subtraction to determine whether there is a match between the extracted representation and a representation of a known target object in operation 408. In such examples, system 300 may obtain image data that corresponds to the depth positions in the extracted representation. System 300 may also obtain image data of the representation of the known target object. System 300 may then subtract pixel values of pixels in the image data of the extracted representation from pixel values of similarly positioned pixels in the image data of the representation of the known target object. When the result of such image subtraction is zero or almost zero, the extracted representation and the representation of a known target object may be considered as being a perfect match. However, system 300 may be configured to determine that there is a match between the extracted representation and the representation of a known target object as long as the subtracted result is within some predefined threshold from zero.

Based on the identified match, system 100 may identify the object as a target object located in the surgical space in operation 410.

Figure 5:
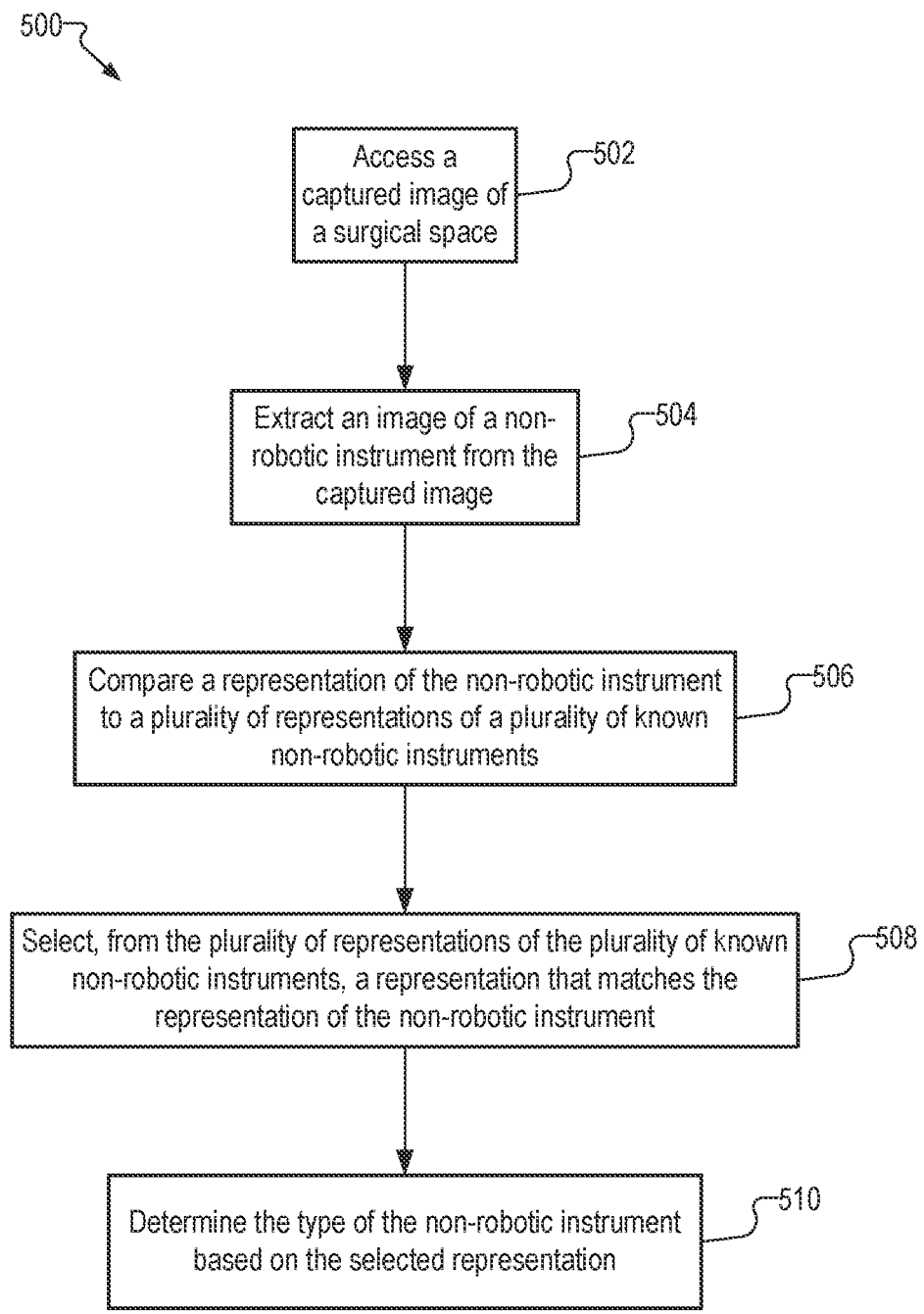

In certain examples, the determination that a target object is located in a surgical space may include system 300 determining what type of target object is located in the surgical space. System 300 may determine the type of the target object located in a surgical space in any suitable manner. For example, FIG. 5 illustrates a flow chart 500 that depicts exemplary operations that may be performed by system 300 when system 300 determines a type of a non-robotic instrument located in a surgical space. In operation 502, system 300 may access an image of a surgical space (e.g., an image captured by imaging device 202).

In operation 504, system 300 may extract an image of a non-robotic instrument from the captured image, System 300 may extract the image in any suitable manner using any suitable image processing technique. For example, system 300 may use computer vision techniques and image segmentation to locate boundaries (lines, curves, etc.) of the non-robotic instrument in the captured image to determine a representation of the non-robotic instrument. In certain examples, such a representation may correspond to an outer contour shape of the non-robotic instrument and/or any other suitable representation, such as those described herein. An outer contour shape of a target object such as a non-robotic instrument may define a profile of a perimeter of the target object when viewed from a particular viewpoint within the surgical space. Based on the representation of the non-robotic instrument, system 300 may extract the image of the non-robotic instrument from a remainder of the captured image.

In operation 506, system 300 may compare a representation of the non-robotic instrument to a plurality of representations (e.g., a plurality of outer contour shapes) of a plurality of known non-robotic instruments. Each representation included in the plurality of representations of the plurality of known non-robotic instruments may represent a different type of non-robotic instrument. For example, a first representation included in the plurality of representations of known non-robotic instruments may be representative of a first type of non-robotic instrument, the second representation may be representative of a second type of non-robotic instrument, and the third representation may be representative of a third type of non-robotic instrument.

System 300 may compare the representation of the non-robotic instrument to the plurality of representations of a plurality of known non-robotic instruments system in any suitable manner. For example, system 300 may compare the representation to the first representation, the second representation, and the third representation that are each included in the plurality of representations of the plurality of known non-robotic instruments. Based on the comparison, system 300 may determine, in any suitable manner, a degree of similarity between the representation of the non-robotic instrument and each of the first, second, and third representations.

From the plurality of representations of the plurality of known target objects, system 300 may select a representation that matches the representation of the non-robotic instrument in operation 508. System 300 may determine that the selected representation matches the representation of the non-robotic instrument in any suitable manner. Continuing with the example described above, system 300 may determine that the degree of similarity between the representation of the non-robotic instrument and the third representation is relatively higher than the degree of similarity between the representation of the non-robotic instrument and the first and second representations. Accordingly, system 300 may select the third representation as matching the representation of the non-robotic instrument.

In operation 510, system 300 may determine the type of the non-robotic instrument based on the selected matching representation. This may be accomplished in any suitable manner. For example, continuing with the example described above, system 300 may determine that the type of the non-robotic instrument corresponds to the type of non-robotic instrument represented by the third representation included in the plurality of representations of known non-robotic instruments.

In certain alternative examples, system 300 may be configured to determine that a target object is located in a surgical space based on information provided by a user of surgical system 100. For example, assistant 110-2, nurse 110-3, and/or any other individual associated with a surgical procedure may place a target object within a surgical space and then enter information, in any suitable manner, that indicates that the target object is in the surgical space. In certain examples, such information may also indicate the type of target object, an insertion location of the target object, and/or any other suitable information associated with the target object.

In certain examples, system 300 may be configured to provide a notification to a user (e.g., surgeon 110-1) indicating that a target object has been detected in a surgical space and/or providing any suitable information to the user to facilitate an intended interaction with the target object. System 300 may provide such a notification in any suitable manner. For example, system 300 may provide a text-based notification in an interface displayed by way of the stereoscopic image viewer of user control console 104. Such a text-based notification may inform the user that a target object has been detected in the surgical space and may provide any other suitable information associated with the target object. Additionally or alternatively, system 300 may be configured to provide any suitable audible notification indicating that a target object has been detected in a surgical space. For example, an exemplary audible notification may include system 300 playing an audio clip with the expression "An ultrasound probe has been inserted."

In certain examples, system 300 may be configured to detect an intent of a user of a computer-assisted surgical system to use a robotic instrument attached to the computer-assisted surgical system to interact with the target object while the target object is located in the surgical space. System 300 may detect the intent of the user to interact with a target object in any suitable manner. In certain examples, system 300 may provide a notification to the user prompting the user to indicate whether the user intends to interact with a target object. For example, system 300 may provide a notification, in any suitable manner, to the user indicating that a target object has been detected in the surgical space, Such a notification may also inquire, in any suitable manner, whether the user intends to interact with the target object. System 300 may then detect any suitable user input that may be provided by the user to indicate the intent of the user to interact with a target object.

For example, system 300 may detect the intent of the user to interact with a target object by detecting a voice-based command provided by a user (e.g., surgeon 110-1, assistant 110-2, etc.) of surgical system 100. System 300 may detect a voice-based command in any suitable manner using any suitable speech recognition algorithm. In certain examples, system 300 may store (e.g., through storage facility 304) one or more predefined voice-based commands that are configured to cause system 300 to determine that the user intends to interact with a target object. For example, the expressions "I want to use ultrasound," "pick up ultrasound probe," etc. may correspond to exemplary pre-defined voice-based commands that system 300 may be configured to use to determine the intent of the user to interact with a target object that corresponds to a drop-in ultrasound probe.

Additionally or alternatively, system 300 may detect a gesture-based command provided by a user of the computer-assisted surgical system. Such a gesture-based command may include any suitable input (that may be provided by way of any suitable user interface associated with surgical system 100. For example, system 300 may detect a gesture-based command provided by way of surgeon 110-1 manipulating master controls of user control system 104 (e.g., one or more commands that cause a robotic instrument to move toward and/or within a threshold distance of the target object). Additionally or alternatively, system 300 may detect a gesture-based command provided by way of an input (e.g., a touch input, a mouse cursor input, etc.) with respect to display monitor 114 or any other device that may be communicatively coupled to surgical system 100.

In certain examples, system 300 may detect the intent of a user to interact with a target object by detecting a gaze-based command provided by the user. Such a gaze-based command may be detected by system 300 in any suitable manner. For example, system 300 may be configured to access, in any suitable manner, images generated by an imaging device provided within the stereoscopic image viewer of user control system 104. Based on the generated images, system 300 may determine a gaze point of the user's eye by determining a positional relationship between the pupil of the user's eye and a corneal reflection caused by infrared light provided by an infrared light source within user control system 104. System 300 may then infer the gaze point of the user's eye in any suitable manner based on the determined positional relationship.

When the gaze point of the user's eye dwells on the target object for a predetermined amount of time, system 300 may determine that the user of the computer-assisted surgical system intends to interact with the target object. The predetermined amount of time may correspond to any suitable amount of time that may be used to determine the intent of the user. For example, the predetermined amount of time may correspond to three seconds in certain implementations. In such an example, whenever the user's gaze point dwells on the target object for three or more seconds, system 300 may determine that the user intends to interact with the target object.

Additionally or alternatively, system 300 may be configured to detect the intent of the user based on a procedural context associated with a surgical space. The procedural context associated with a surgical space may be determined based on any suitable information or combination of information associated with the surgical space. For example, system 300 may detect the procedural context based on an image of the surgical space, user input indicating procedural context, a configuration of one or more robotic instruments (e.g., robotic instruments 112) located within the surgical space, and/or kinematics of the one or more robotic instruments. Based on the detected procedural context, system 300 may detect that the user intends to interact with a target object.

To illustrate an example, a procedural context associated with a surgical space may be associated with use of a drop-in ultrasound probe within the surgical space. In such an example, system 300 may determine that a user intends to interact with the ultrasound probe based on a captured image of the surgical space that shows the ultrasound probe being present within the surgical space. In another example, a procedural context associated with a surgical space may be associated with a suturing operation to be performed in the surgical space. In such an example, system 300 may determine a user intends to interact with a non-robotic instrument such as suture needle based on the combination of a suture needle being detected in the surgical space and a needle driver robotic instrument being located in the surgical space and grasping the suture needle.

System 300 may detect the intent of the user to interact with a target object at any suitable time. For example, system 300 may detect the intent of the user after system 300 determines that the target object is located in the surgical space. Alternatively, system 300 may detect the intent of the user to interact with the target object before system 300 determines that the target object is located in the surgical space and/or independently of system 300 determining that the target object is located in the surgical space. In certain examples, system 300 may detect the intent of the user to use a robotic instrument to interact with a target object in response to system 300 determining that the target object is located in the surgical space. That is, the detection of a target object in the surgical space may trigger system 300 performing an operation to detect whether the user intends to interact with the target object.

System 300 may further be configured to determine a pose of a target object within a surgical space. As used herein, a "pose" of a target object refers to the combination of the position of the target object and the orientation of the target object in a surgical space. The pose may be referred to as a six-dimension (6D) pose because there are three degrees of freedom associated with the position of an object and three degrees of freedom associated with the orientation of the object. System 300 may determine the pose of a target object in any suitable manner. For example, the pose of a target object may be determined based on a combination of depth data (e.g., provided in a depth map of a surgical space) and a determined orientation of the target object within in the surgical space. Exemplary ways that system 300 may determine an orientation of a target object will now be described.

Figure 6:
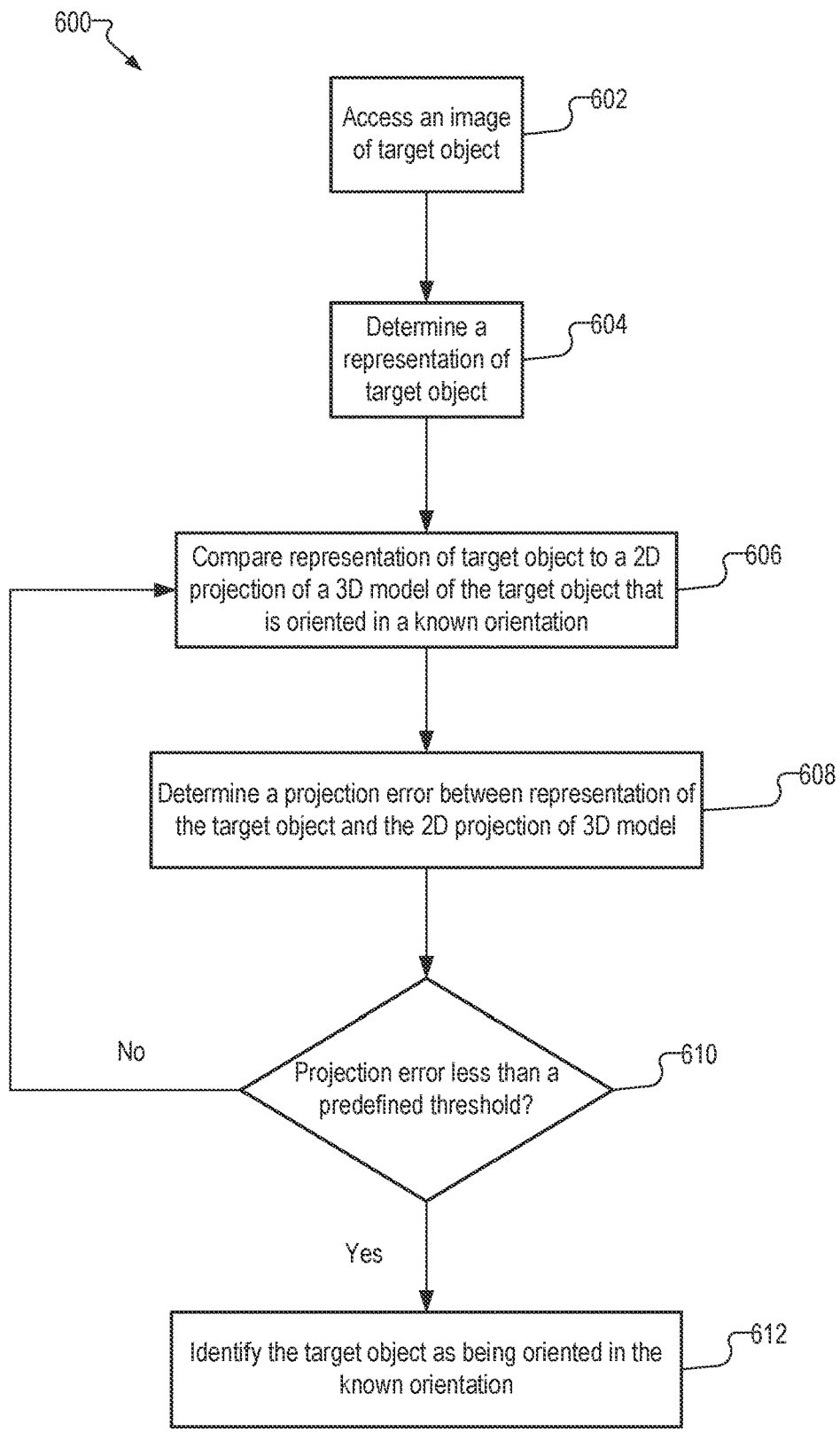

In certain examples, system 300 may determine an orientation of a target object by using a 3D model of the target object. System 300 may use a 3D model of a target object in any suitable manner to facilitate determining an orientation of the target object. For example, FIG. 6 shows an exemplary flow chart 600 that includes operations that may be performed by system 300 when using a 3D model to determine an orientation of a target object. As shown in FIG. 6, in operation 602, system 300 is configured to access an image of a target object in a surgical space (e.g., an image captured by imaging device 202). In operation 604, system 300 is configured to determine a representation (e.g., an outer contour shape) of the target object from a viewpoint of the imaging device. System 300 may use any suitable image processing algorithm to determine the representation of the target object. In operation 606, system 300 compares the representation of the target object to a 2D projection of a 3D model of the target object that is oriented in a known orientation. In operation 608, system 300 is configured to determine a projection error between the representation of the target object and the 2D projection of the 3D model. The projection error may correspond to any quantifiable metric that is indicative of a difference between an orientation of a representation of a target object and an orientation of a 2D projection of a 3D model. The greater the projection error, the less likely that the target object is oriented in the known orientation. As such, system 300 may determine that the target object is not in the known orientation when the projection error is above a predefined threshold.

In operation 610, system 300 is configured to determine whether the projection error is less than a predefined threshold. If the answer to operation 610 is "Yes," then system 300 is configured to identify the target object as being oriented in the known orientation in operation 612. On the other hand, if the answer to operation 610 is "No," system 300 is configured to change the orientation of the 3D model and generate an additional 2D projection of the 3D model of the target object that is oriented in an additional known orientation. The process then returns to operation 606 in which system 300 determines an additional projection error between the representation of the target object and the additional 2D projection of the 3D model. System 300 may then repeat operation 610 to determine whether the additional projection error is less than the predefined threshold.

System 300 may repeat operations 606-610 until the orientation of the target object is determined.

In addition to system 300 determining the orientation of the target object, system 300 may determine the position of the target object within the surgical space. This may be accomplished in any suitable manner. For example, system 300 may use depth data and/or any other suitable data to determine the position of the target object within the surgical space. System 300 may then determine the pose of the target object within the surgical space based on the combination of the determined orientation of the target object and the determined position of the target object within the surgical space.

In certain examples, system 300 may determine a pose of a target object based on the position of the target object within the surgical space and an orientation of one or more markers provided on an outer surface of a target object. In such examples, a particular orientation of one or more markers when viewed from a particular viewpoint may be indicative of a particular orientation of the target object within the surgical space. For example, two markers may be provided on an outer surface of a non-robotic instrument. A first orientation of the two markers may be indicative of a first orientation of the non-robotic instrument, a second orientation of the two markers may be indicative of a second orientation of the non-robotic instrument, and a third orientation of the two markers may be indicative of a third orientation of the non-robotic instrument. System 300 may detect whether the two markers are in the first orientation, the second orientation, or the third orientation in any suitable manner. For example, system 300 may analyze an image of the surgical space in any suitable manner to determine the orientation of the two markers from a particular viewpoint.

In certain examples, the one or more markers may also be used to identify the type of a non-robotic instrument located in a surgical space. For example, a particular type of a marker, position of a marker, combination of markers, and/or configuration of a marker may indicate the type of the non-robotic instrument.

Figure 7:
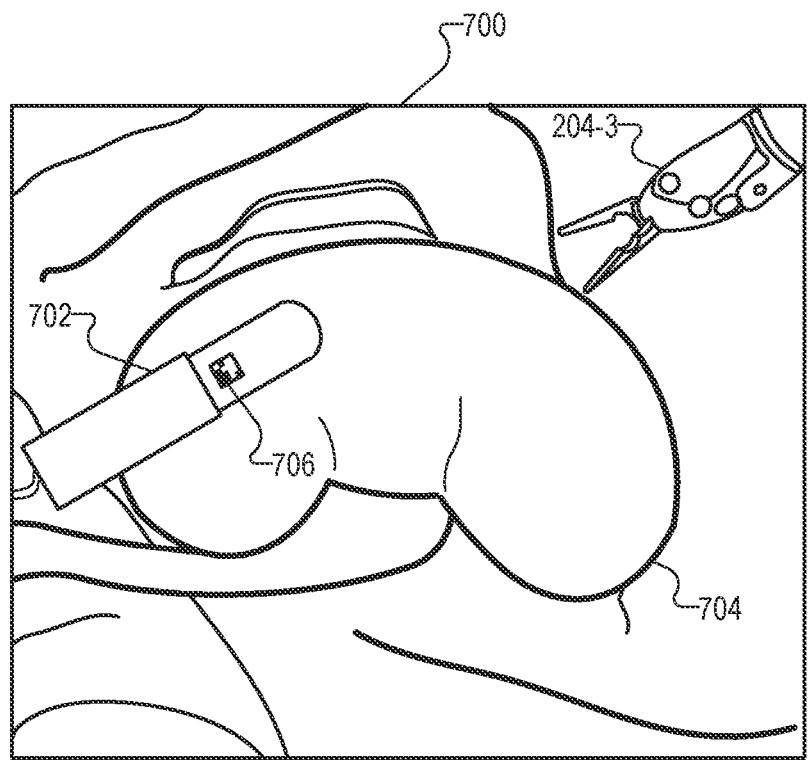
FIGS. 7-9 illustrate exemplary images of a surgical space according to principles described herein.

A marker provided on an outer surface of a target object may have any suitable configuration as may serve a particular implementation. To illustrate an example, FIG. 7 shows an image 700 of a surgical space in which a non-robotic instrument 702 and robotic instrument 204-3 are provided in relation to a kidney 704 of a patient (e.g., patient 108). As shown in FIG. 7, non-robotic instrument 702 includes a marker 706 having a set of distinct marker elements in a distinctive grid pattern of either dark or light squares. The set of distinct marker elements form a distinct pattern that facilitates system 300 distinguishing marker 706 from other features in image 700. Although FIG. 7 only shows one marker 706, it is understood that any suitable number of markers 706 may be provided on the outer surface of non-robotic instrument 702 to facilitate system 300 determining the pose of non-robotic instrument 702.

System 300 may detect the pose of a target object within a surgical space at any suitable time. In certain examples, system 300 may detect the pose of the target object within a surgical space after detecting the intent of a user to interact with the target object. Alternatively, system 300 may detect the pose after or concurrently with the detection of the target object being located in the surgical space. In certain examples, system 300 may detect the pose of a target object in response to system 300 detecting that the target object is located in a surgical space. That is, the detecting of the target object in the surgical space may trigger system 300 performing an operation to detect the pose of the target object.

In certain examples, the pose of a target object may change during a surgical procedure performed with respect to a surgical space. When the target object changes position and/or orientation within the surgical space, system 300 may determine an updated pose of the target object in the surgical space in any suitable manner, such as described herein. In certain examples, system 300 may be configured to continually monitor and update the pose of a target object during a surgical procedure. Alternatively, system 300 may periodically determine an updated pose of a target object.

Based on the detected intent of the user to interact with a target object and the determined pose of the target object in the surgical space, system 300 may perform an operation with respect to the target object. Such an operation may correspond to any suitable action that may facilitate a user interacting with and/or using the target object in the surgical space. For example, an operation that may be performed with respect to a target object may comprise, but is not limited to, system 300 determining an optimal robotic instrument to use to interact with a target object, instructing a user to insert a specific robotic instrument (e.g., a grasper instrument) within a surgical space, determining potential robotic instrument grasp poses, determining an optimal robotic instrument grasp pose, facilitating a robotic instrument grasping a target object, generating an optimal motion path for a robotic instrument to follow to interact with a target object (e.g., while taking into consideration a configuration of a computer-assisted surgical system, kinematic constraints of the computer-assisted surgical system, and/or environmental constraints of a surgical space), providing a graphical representation of an optimal motion path for display to a user, facilitating a robotic instrument performing an operation while the robotic instrument grasps a target object, and/or performing any other suitable operation.

In certain examples, it may be desirable to reposition a target object within a surgical space to facilitate system 300 performing an operation with respect to the target object. In such examples, system 300 may provide an instruction to the user of the computer-assisted surgical system to reposition the target object in the surgical space. System 300 may instruct a user to reposition a target object in any suitable manner. To illustrate an example, when a target object corresponds to a drop-in ultrasound probe, it may be desirable to rotate the drop-in ultrasound probe such that the drop-in ultrasound probe is in a better orientation for grasping by a robotic instrument. Accordingly, system 300 may instruct the user to, for example, manually twist a cord attached to the drop-in ultrasound probe to reposition the drop-in ultrasound probe. Alternatively, system 300 may instruct the user to use a robotic instrument to grasp and reposition the drop-in ultrasound probe in any suitable manner. After the drop-in ultrasound probe is repositioned, system 300 may determine an updated pose of the drop-in ultrasound probe in any suitable manner, such as described herein. Based on the determined updated pose of the drop-in ultrasound probe, system 300 may perform any suitable additional operation with respect to the drop-in ultrasound probe.

In certain implementations, system 300 may direct surgical system 100 to automatically perform an operation to facilitate a user interacting with and/or using a target object. As used herein, the expression "automatically" means that an operation (e.g., moving a robotic instrument) or series of operations are performed without requiring further input from a user. For example, exemplary systems such as any of those described herein may be configured to automatically move a robotic instrument to a target object, automatically adjust a grasp pose of the robotic instrument, automatically grasp the target object with a robotic instrument, and/or automatically use the robotic instrument to move the target object in any suitable manner within the surgical space, without requiring additional input from a user (e.g., surgeon 110-1).

In certain alternative implementations, system 300 may be configured to assist a user in using a robotic instrument to grasp a target object. To that end, system 300 may be configured to instruct a user of surgical system 100 to control a robotic instrument so as to grasp a target object with the robotic instrument. System 300 may instruct the user in any suitable manner. For example, in certain implementations, system 300 may be configured to provide visual guidance to the user to assist the user in controlling the robotic instrument to grasp the target object. Such visual guidance may be provided in any suitable manner. For example, system 300 may provide graphical objects overlaid over an image (e.g., an image displayed by way of the stereoscopic image viewer of user control system 104) of the surgical space that is displayed to a user. Such graphical objects may be indicative of a suggested robotic instrument movement path, a suggested robotic instrument grasp pose, etc. that may facilitate an intended interaction with a target object.

Figure 8B:
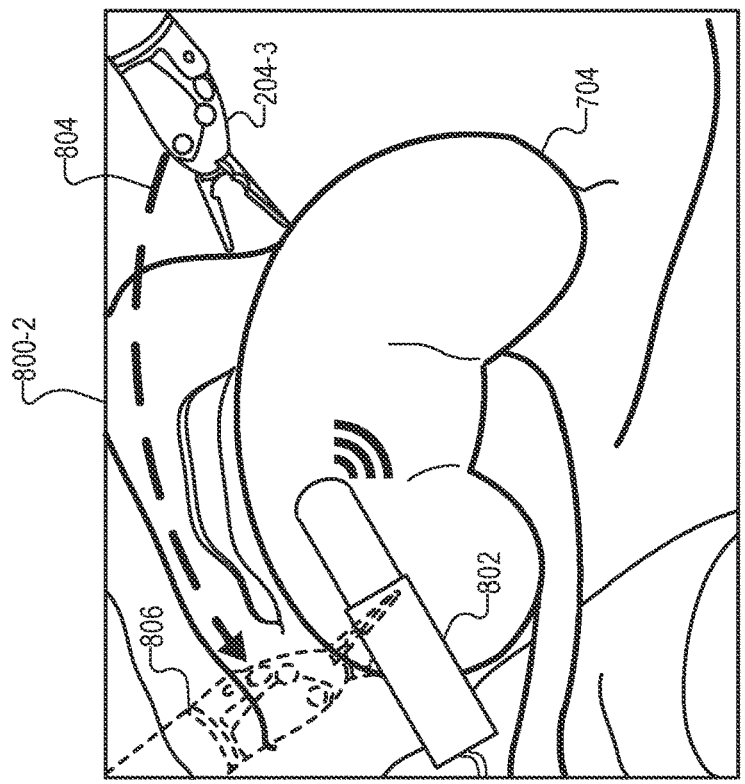
Figure 8A:
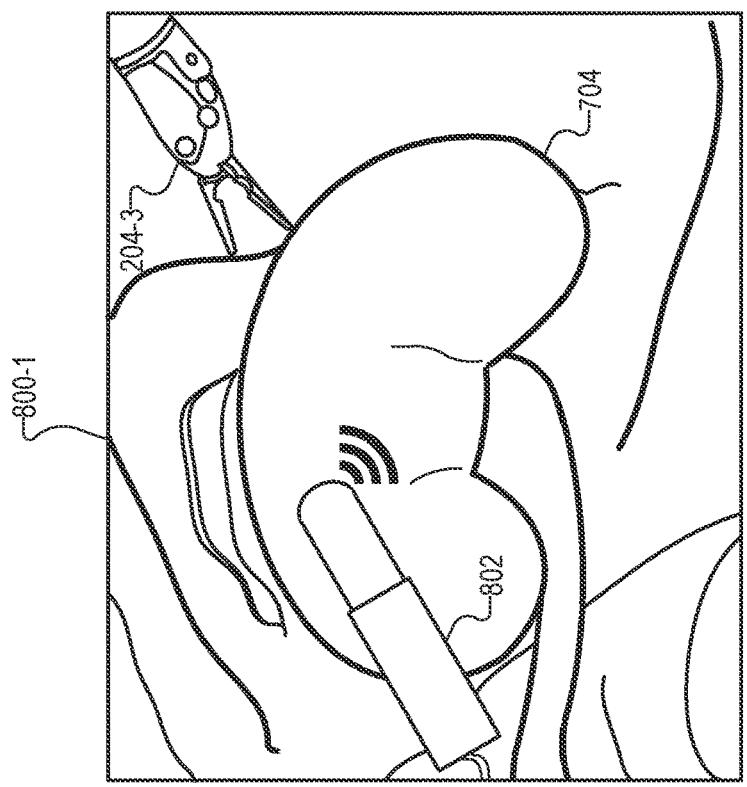

To illustrate an example, FIGS. 8A and 8B show exemplary images 800 (e.g., images 800-1 and 800-2) of a surgical space where a surgical procedure is being performed with respect to a patient (e.g., patient 108). As shown in FIG. 8A, image 800-1 depicts a drop-in ultrasound probe 802 provided together with robotic instrument 204-3 in a surgical space that includes kidney 704 of the patient. Drop-in ultrasound probe 802 is configured to capture ultrasound images of sub-surface tissue of kidney 704. However, because drop-in ultrasound probe 802 is a non-robotic instrument, a robotic instrument such as robotic instrument 204-3 must be used to grasp drop-in ultrasound probe 802 to adequately move drop-in ultrasound probe 802 in relation to kidney 704 to capture the ultrasound images. Accordingly, robotic instrument 204-3 is shown in FIGS. 8A and 8B as a grasper-type robotic instrument that is configured to grasp and move drop-in ultrasound probe 802.

To facilitate robotic instrument 204-3 being used to grasp drop-in ultrasound probe 802, system 300 is configured to determine a pose of drop-in ultrasound probe 802 in any suitable manner, such as described herein. After system 300 determines the pose of drop-in ultrasound probe 802, system 300 may be configured to provide visual guidance to facilitate the user interacting with drop-in ultrasound probe 802. Examples of such visual guidance are shown in FIG. 8B. In particular, FIG. 8B depicts an optimal motion path 804 for robotic instrument to follow to grasp drop-in ultrasound probe 802. In addition, FIG. 8B depicts a virtual image 806 of robotic instrument 204-3 in a suggested robotic instrument grasping position. Through such assistance, a user (e.g., surgeon 110-1) can readily determine where to grasp drop-in ultrasound probe 802, an optimal orientation for robotic instrument 204-3 to use to grasp drop-in ultrasound probe 802, and an optimal motion path along which to move robotic instrument 204-3 to grasp drop-in ultrasound probe 802.

Additionally or alternatively, system 300 may be configured to provide haptic feedback to facilitate a user of surgical system 100 controlling a robotic instrument to grasp a target object. Such haptic feedback may be provided in any suitable manner. For example, as the user moves robotic instrument 204-3 so as to follow optimal motion path 804 shown in FIG. 8, system 300 may provide haptic feedback in the form of vibration of the master controls of user control system 104 whenever the user deviates from optimal motion path 804.

Additionally or alternatively, system 300 may be configured to provide audible guidance to facilitate a user of surgical system 100 controlling a robotic instrument to grasp a target object. Such audible guidance may be provided in any suitable manner. For example, as the user moves robotic instrument 204-3 so as to follow optimal motion path 804 shown in FIG. 8, audible guidance in the form of a "beep" noise may be provided whenever the user deviates from optimal motion path 804.

Figure 9:
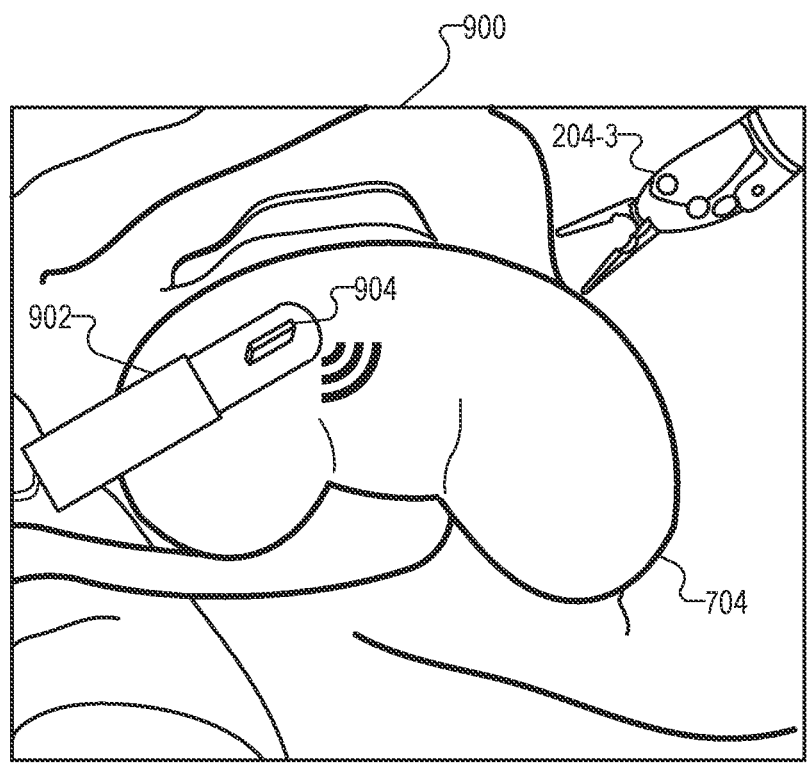

In certain examples, a target object such as a non-robotic instrument may include a protrusion provided on an outer surface of the non-robotic instrument to facilitate system 300 grasping the target object. In examples were a protrusion is provided on an outer surface of a non-robotic instrument, system 300 may determine a pose of the protrusion as part of system 300 determining the pose of the non-robotic instrument. A protrusion of a non-robotic instrument may have any suitable size and/or configuration to facilitate the non-robotic instrument being grasped by a robotic instrument (e.g., robotic instrument 204-3) attached to surgical system 100. To illustrate an example, FIG. 9 shows an exemplary image 900 of a surgical space in which a drop-in ultrasound probe 902 and robotic instrument 204-3 are provided in relation to kidney 704. As shown in FIG. 9, drop-in ultrasound probe 902 includes a protrusion 904 provided on an outer surface of drop-in ultrasound probe 902 that is configured to be grasped by robotic instrument 204-3 in any suitable manner.

In certain examples, system 300 may use machine learning to perform any of the operations described herein. For example, system 300 may use machine learning to determine whether a target object is located in a surgical space. In certain examples, system 300 may use a supervised machine learning algorithm to determine whether a target object is located in a surgical space. In such examples, the training inputs to the supervised machine learning algorithm may include a plurality of images of a surgical space in which target objects positioned therein are labeled. System 300 may use the supervised machine learning algorithm in any suitable manner during a training phase to analyze the plurality of images of the surgical space with the labeled target objects. After the training phase, system 300 may obtain, as an operational input, an image of a surgical space which may or may not include a target object. System 300 may use the supervised machine learning algorithm in any suitable manner (e.g., by using a deep neural network) to analyze the image of the surgical space that may include a target object and detect whether any portion of the target object is located in the surgical space based on the analysis. In certain alternative implementations, system 300 may use an unsupervised machine learning algorithm to perform any of the operations described herein.

Additionally or alternatively, in certain examples, system 300 may use machine learning to detect the orientation of a target object within a surgical space. For example, system 300 may use a supervised machine learning algorithm to detect the orientation of a target object. In such examples, the training inputs to the supervised machine learning algorithm may include a plurality of images of a surgical space in which the orientations of target objects positioned therein are labeled. System 300 may use the supervised machine learning algorithm in any suitable manner during a training phase to analyze the plurality of images of the surgical space in which the orientations of the target objects are labeled. After the training phase, system 300 may obtain an image of a surgical space in which the orientation of a target object is not known as an operational input. System 300 may use the supervised machine learning algorithm in any suitable manner to analyze the image of the surgical space in which the orientation of a target object is not known and detect the orientation of the target object based on the analysis.

Additionally or alternatively, in certain examples, system 300 may use machine learning to determine an intent of a user to interact with a target object. For example, system 300 may use a supervised machine learning algorithm to detect the intent of the user to interact with the target object. In such examples, the training inputs to the supervised machine learning algorithm may include a plurality of procedural contexts which have been labeled as procedural contexts in which the user intends to interact with a target object, Such procedural contexts may include any suitable information associated with the surgical space that may be used to determine the intent of the user. For example, a procedural context may include information specifying a configuration of robotic instruments, detection of any suitable vision-based command, voice-based command, and/or combination thereof such as described herein. System 300 may use the supervised machine learning algorithm in any suitable manner during a training phase to analyze the plurality of procedural contexts. After the training phase, system 300 may obtain information regarding a current procedural context as an operational input. System 300 may use the supervised machine learning algorithm in any suitable manner to analyze the information regarding a current procedural context and detect whether the user intends to interact with the target object based on the analysis.

Figure 10:
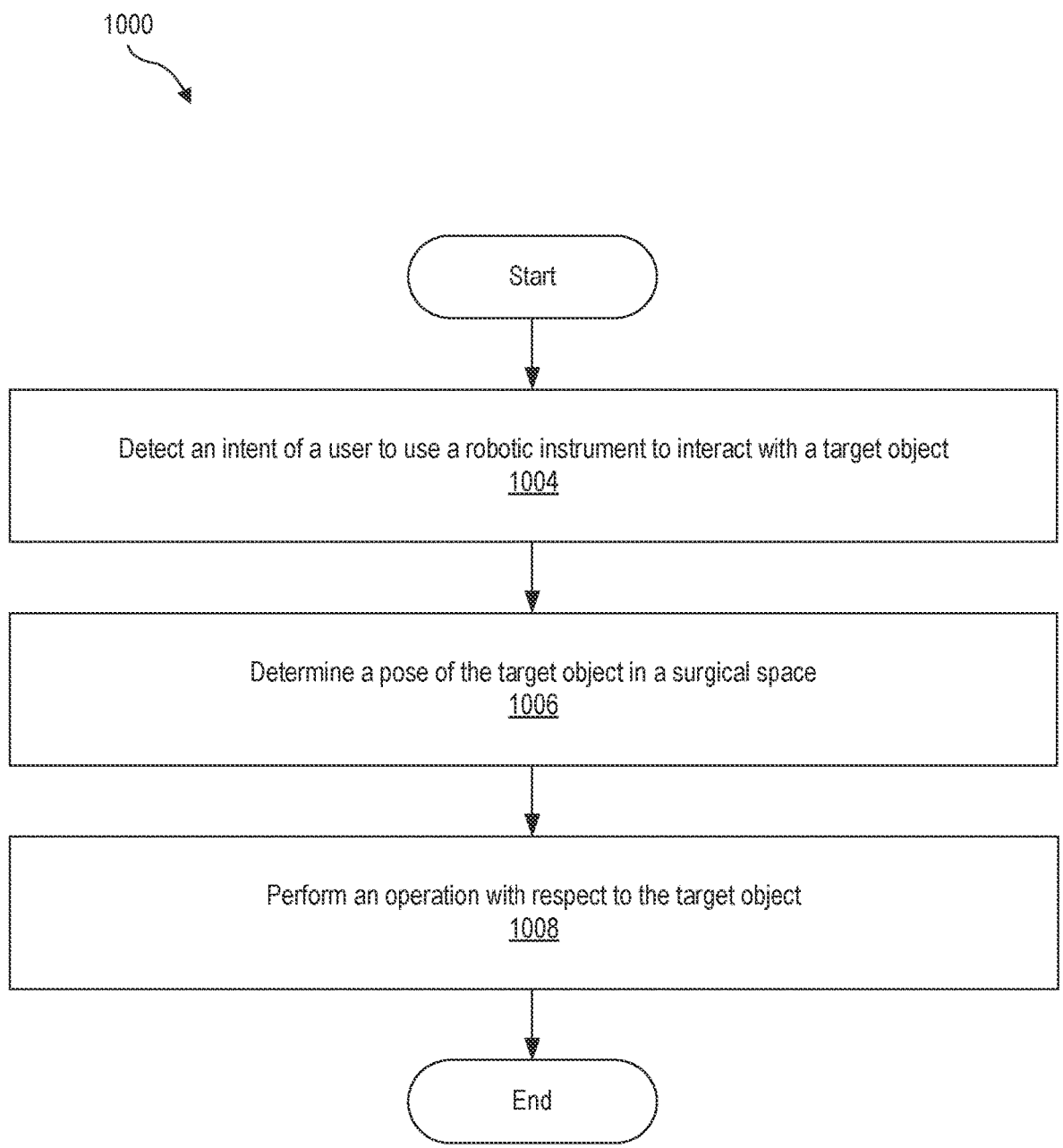
FIG. 10 illustrates exemplary method for identifying and facilitating an intended interaction with a target object in a surgical space according to principles described herein.

FIG. 10 illustrates an exemplary method for identifying and facilitating an intended interaction with a target object in a surgical space. While FIG. 10 illustrates exemplary operations according to one embodiment, other embodiments may omit, add to, reorder, and/or modify any of the operations shown in FIG. 10. One or more of the operations shown in FIG. 10 may be performed by a system such as system 300, any components included therein, and/or any implementation thereof.

In operation 1002, a processor (e.g., a processor implementing processing facility 302) associated with a computer-assisted surgical system (e.g., surgical system 100) may detect an intent of a user of the computer-assisted surgical system to use a robotic instrument attached to the computer-assisted surgical system to interact with a target object while the target object is located in a surgical space. Operation 1002 may be performed in any of the ways described herein.

In operation 1004, the processor may determine a pose of the target object in the surgical space. Operation 1004 may be performed in any of the ways described herein.

In operation 1006, the processor may perform, based on the detected intent of the user to interact with the target object and the determined pose of the target object in the surgical space, an operation with respect to the target object. Operation 1006 may be performed in any of the ways described herein.

Although the preceding disclosure describes operations associated with identification of a target object in a surgical space, it is understood that system 300 may also perform various operations associated with facilitating a robotic instrument interacting with a target object. To facilitate use of such a robotic instrument, system 300 (e.g., processing facility 302) may be configured to determine a robotic instrument to be used to interact with a target object located in a surgical space. System 300 may determine the robotic instrument to be used to interact with a target object in any suitable manner. For example, in certain implementations, system 300 may access a database that stores information that specifies a plurality of robotic instruments. The information included in the database may include any suitable information associated with the plurality of robotic instruments. For example, the information may include information regarding robotic instrument types, grasping capabilities, articulation capabilities, dimensions, and/or any other suitable information associated with the plurality of robotic instruments. Such a database may be stored by storage facility 304 and/or any other suitable storage device accessible to system 300.

From the information in the database, system 300 may determine at least some of the robotic instruments included in the plurality of robotic instruments to be candidates for interaction with a target object. This may be accomplished in any suitable manner. In certain examples, system 300 may select robotic instruments of a particular type or having certain features as being potential candidates to interact with a target object. For example, system 300 may select all or certain grasping-type robotic instruments included in the plurality of robotic instruments as being possible candidate robotic instruments to be used to interact with a target object. Each grasping-type robotic instrument may have different grasping arm configurations that result in different grasp characteristics. For example, the size, the length, the thickness, etc. of grasping arms of grasping-type robotic instruments may result in different grasp characteristics. In such examples, system 300 may identify one or more of the grasping-type robotic instruments as candidates for interaction with a target object based on the grasp characteristics and/or any other suitable information associated with the surgical space.

In certain examples, the robotic instruments determined by system 300 as being potential candidates to interact with a target object may be currently located in a surgical space. Alternatively, none of the robotic instruments determined by system 300 as being potential candidates to interact with a target object may be currently located in the surgical space. In certain alternative examples, the robotic instruments determined by system 300 as being potential candidates to interact with a target object may include a combination of one or more robotic instruments currently located in the surgical space and one or more robotic instruments included in the plurality of robotic instruments identified in the database. For example, system 300 may determine that one robotic instrument currently located in the surgical space is a candidate to be used to interact with a target object and that one or more additional robotic instruments (which are not currently located in the surgical space) are also candidates.

System 300 may select, from the determined candidate robotic instruments and based on the information stored in the database, a robotic instrument to be used to interact with the target object. System 300 may use any suitable parameters associated with a surgical space and/or a robotic instrument to select a robotic instrument to be used to interact with a target object. For example, system 300 may select a robotic instrument based on an intended use of a target object, a reach of the robotic instrument in the surgical space, a pose of an additional robotic instrument located in the surgical space, a pose of an additional object (e.g., anatomy) located in the surgical space, an amount of movement required to interact with a target object, and/or any other suitable information, System 300 may utilize such information in any suitable manner to facilitate determining which robotic instrument is an optimal robotic instrument to be used to interact with a target object.

To illustrate an example, in certain implementations, system 300 may assign numerical values to parameters such as those described herein that may be used to select an optimal robotic instrument. System 300 may then sum the numerical values for each candidate robotic instrument and select the candidate robotic instrument with the highest summed numerical value as the optimal robotic instrument. For example, system 300 may assign a first numerical value to a current pose of a first candidate robotic instrument, a second numerical value to a distance that the first candidate robotic instrument would have to travel to reach a target object, and a third numerical value to how much the orientation of the first candidate robotic instrument has to change to interact with a target object. System 300 may sum the first, second, and third numerical values to determine a total score for the first candidate robotic instrument. In a similar manner, system 300 may determine a summed numerical value for a second candidate robotic instrument and a third candidate robotic instrument. Based on the determined summed scores, system 300 may determine which of the first candidate robotic instrument, the second candidate robotic instrument, or the third candidate robotic instrument is an optimal robotic instrument to be used to interact with a target object.

Figure 11:
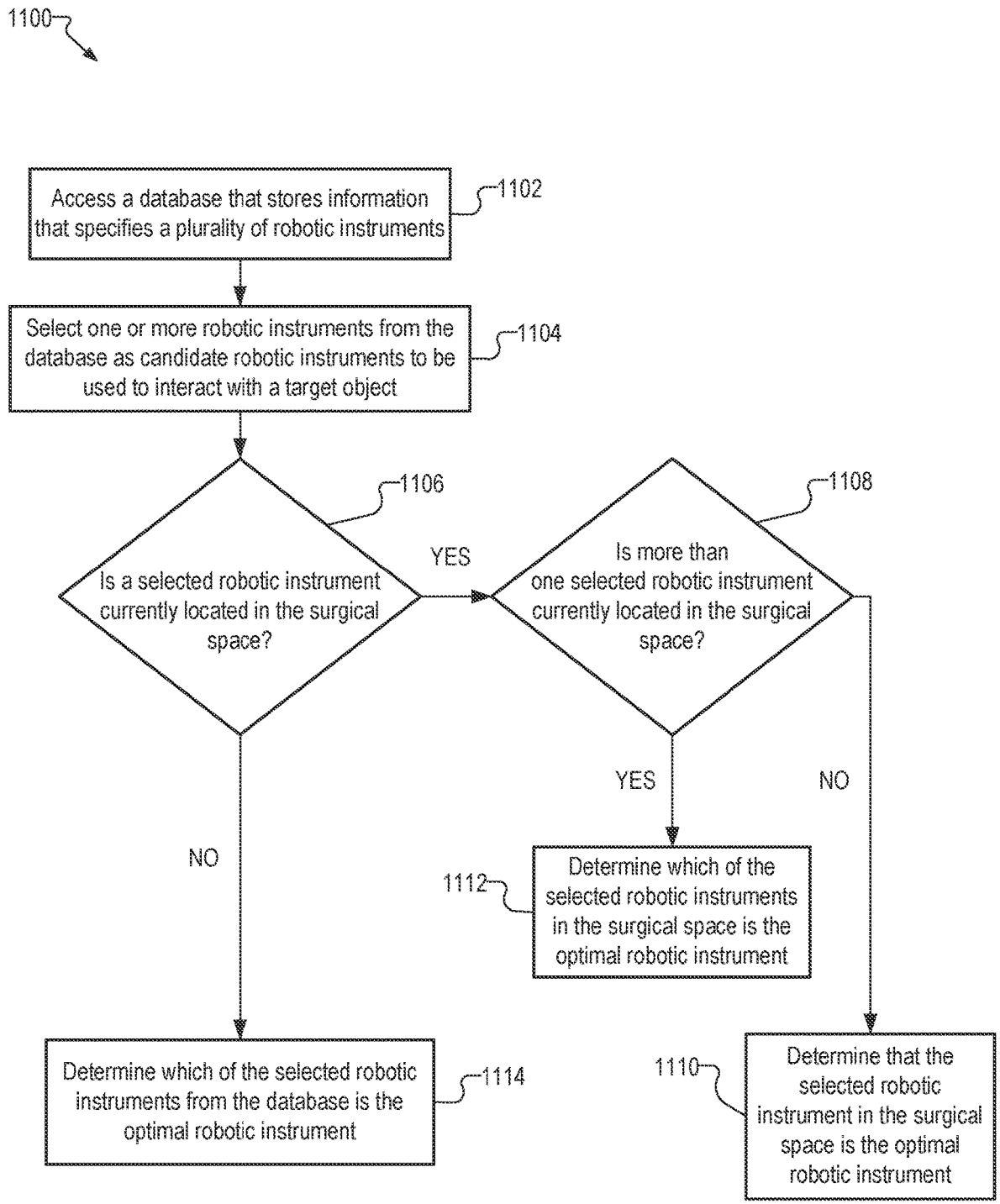
FIGS. 11 and 12 illustrate additional exemplary flow charts depicting various operations that may be performed by the system illustrated in FIG. 3 according to principles described herein.

In certain implementations, certain parameters that may be used to select an optimal robotic instrument may be prioritized (e.g., weighted) over other parameters. For example, a candidate robotic instrument that is currently located in a surgical space may be prioritized over a candidate robotic instrument that is not currently located in the surgical space. To illustrate, FIG. 11 shows a flow chart 1100 with exemplary operations that may be performed by system 300 in certain implementations when determining a robotic instrument to be used to interact with a target object. In operation 1102, system 300 may access a database that stores information that specifies a plurality of robotic instruments. In operation 1104, system 300 may select one or more of the robotic instruments from the database as candidate robotic instruments to be used to interact with a target object. In operation 1106, system may determine whether at least one of the selected robotic instruments is currently located in the surgical space. If the answer to operation 1106 is "Yes," system 300 may determine whether more than one of the selected robotic instruments are currently located in the surgical space in operation 1108. If the answer to operation 1108 is "No," system 300 may determine that the selected robotic instrument that is currently in the surgical space is the optimal robotic instrument to be used to interact with the target object in operation 1110. If the answer to operation 1108 is "Yes," system 300 may determine which of the selected robotic instruments currently located in the surgical space is the optimal robotic instrument to be used to interact with the target object in operation 1112. For example, system 300 may analyze the reach, the pose, and/or any other suitable information associated with the selected robotic instruments to determine which one in the surgical space is better suited to interact with the target object. If the answer to operation 1106 is "No," system 300 may determine which of the selected robotic instruments from the database is the optimal robotic instrument to be used to interact with the target object.

Figure 12:
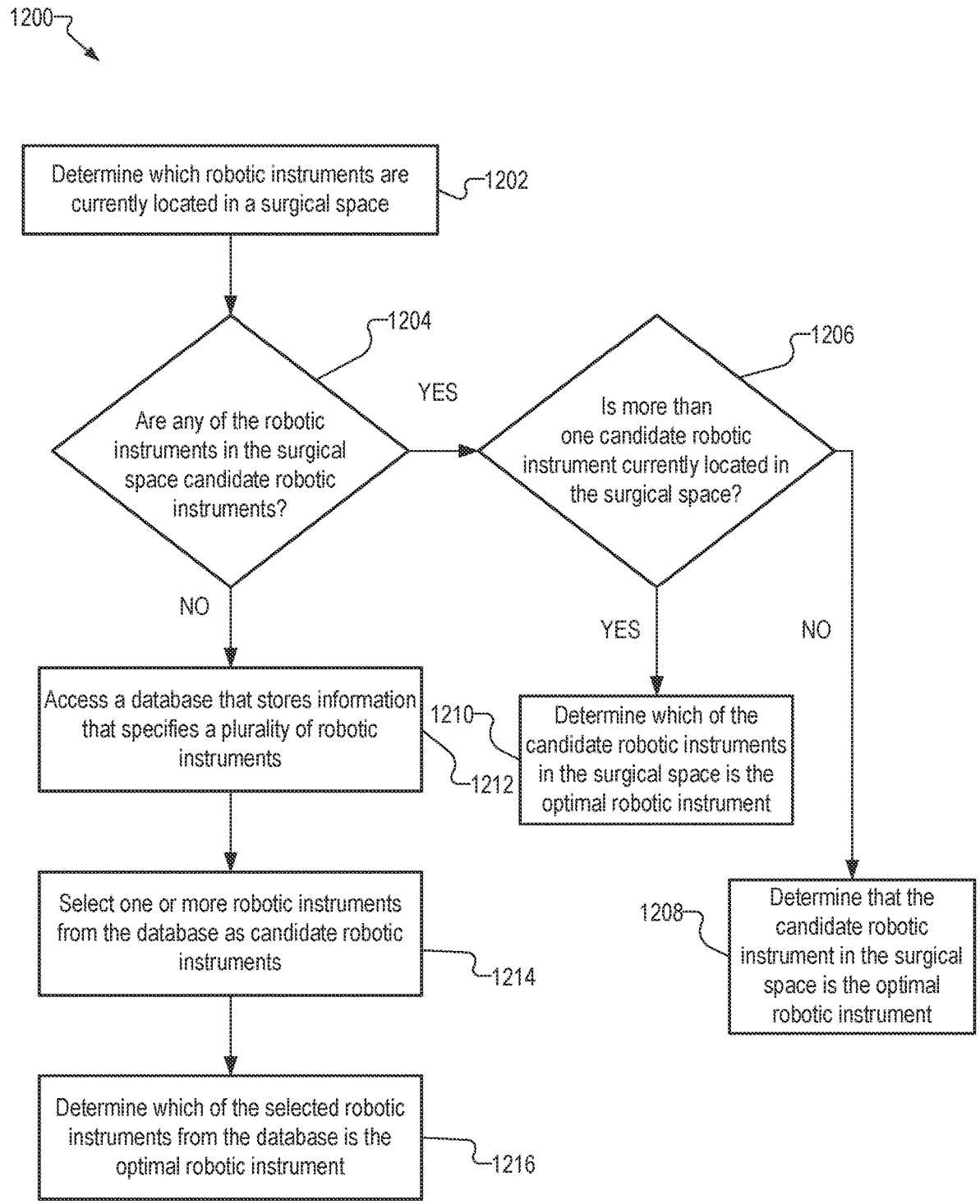

In certain examples, system 300 may first determine whether a candidate robotic instrument is already located in the surgical space prior to accessing a database that stores information that specifies a plurality of robotic instruments. To illustrate, FIG. 12 shows a flow chart 1200 with exemplary operations that may be performed by system 300 in certain alternative implementations when determining a robotic instrument to be used to interact with a target object. In operation 1202, system 300 may determine which robotic instruments are currently located in a surgical space. For example, system 300 may access imagery, depth map data, and/or any other suitable information associated with the surgical space to determine what types of robotic instruments are currently located in the surgical space. In operation 1204, system 300 may determine whether any of the robotic instruments currently located in the surgical space are candidate robotic instruments to be used to interact with a target object. For example, system 300 may determine whether any of the robotic instruments currently located in the surgical space are grasping-type robotic instruments. If the answer to operation 1204 is "Yes," system 300 may determine whether there is more than one candidate robotic instrument currently located in the surgical space in operation 1206. If the answer to operation 1206 is "No," system 300 may determine that the candidate robotic instrument currently located in the surgical space is the optimal robotic instrument to be used to interact with the target object in operation 1208. If the answer to operation 1206 is "Yes," system 300 may determine which of the candidate robotic instruments currently located in the surgical space is the optimal robotic instrument to be used to interact with the target object. If the answer to operation 1204 is "No," system 300 may access a database that stores information that specifies a plurality of robotic instruments in operation 1212. In operation 1214, system 300 may select one or more robotic instruments from the database as candidate robotic instruments to be used to interact with the target object. In operation 1216, system 300 may determine which of the selected robotic instruments from the database is the optimal robotic instrument to be used to interact with the target object.

Figure 13:
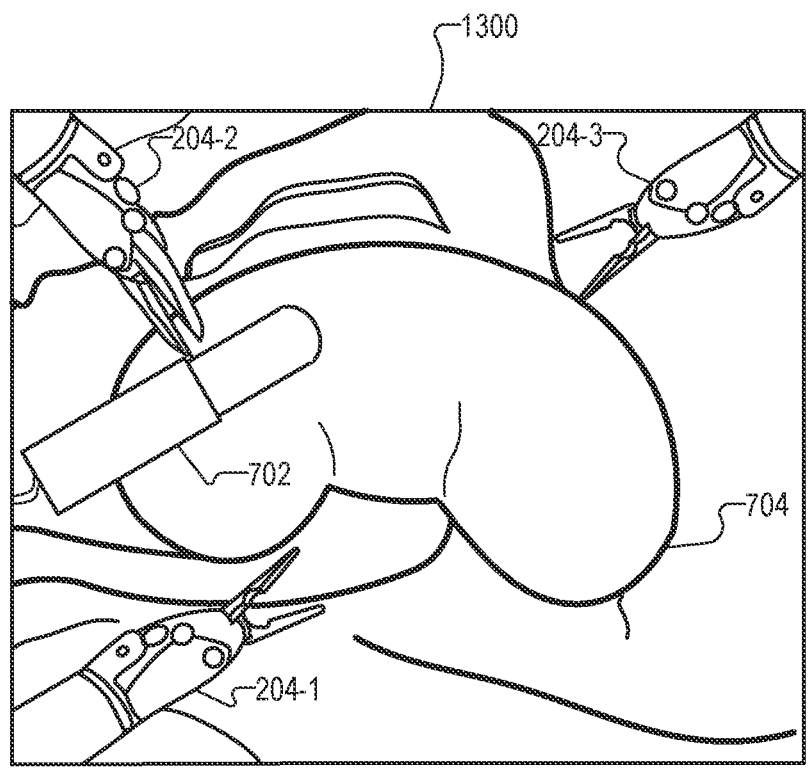
FIG. 13 illustrates an additional exemplary image of a surgical space according to principles described herein.

In certain examples, system 300 may not access the database that stores information that specifies a plurality of robotic instruments to determine an optimal robotic instrument to be used to interact with a target object. Rather, in certain implementations, system 300 may determine that the optimal robotic instrument is already located in the surgical space. To illustrate an example, FIG. 13 shows an image 1300 of a surgical space in which non-robotic instrument 702 and robotic instruments 204-1 through 204-3 are provided in relation to kidney 704 of a patient (e.g., patient 108). As shown in FIG. 13, robotic instruments 204-1 and 204-3 are grasping-type robotic instruments whereas robotic instrument 204-2 is a cutting-type robotic instrument. In view of this, system 300 may determine that robotic instruments 204-1 and 204-3 are better suited to interact with (e.g., grasp) non-robotic instrument 702 than robotic instrument 204-2. In addition, system 300 may determine which one of robotic instrument 204-1 and robotic instrument 204-3 is better suited to interact with non-robotic instrument 702. For example, system 300 may determine, in any suitable manner, that robotic instrument 204-3 does not have sufficient reach within the surgical space to interact with non-robotic instrument 702. However, system 300 may determine that robotic instrument 204-1 has sufficient reach and/or that robotic instrument 204-1 has reach parameters that are more conducive to robotic instrument 204-1 grasping non-robotic instrument 702 when compared to reach parameters of other candidate robotic instruments such as robotic instrument 204-3, As such, system 300 may select robotic instrument 204-1, instead of robotic instrument 204-3, as the robotic instrument to be used to interact with non-robotic instrument 702. Additionally or alternatively, system 300 may determine that a portion of anatomy (e.g., kidney 704 or some other tissue within the surgical space) is positioned so as to block robotic instrument 204-3 from interacting with non-robotic instrument 702. Accordingly, system 300 may select robotic instrument 204-1 instead of robotic instrument 204-3 as the optimal robotic instrument based on such an additional or alternative factor.

In certain examples, system 300 may determine that the robotic instrument to be used to interact with a target object is not currently located in the surgical space. For example, system 300 may determine that none of robotic instruments 204-1 through 204-3 shown in FIG. 13 correspond to an optimal robotic instrument to be used to interact with non-robotic instrument 702. In such examples, system 300 may instruct a user (e.g., assistant 110-2, nurse 110-3, etc.) of a computer-assisted surgical system to insert a different robotic instrument (e.g., a robotic instrument selected from the database) in the surgical space.

System 300 may instruct the user to insert a robotic instrument in any suitable manner. For example, system 300 may provide any suitable audible notification and/or visual notification to instruct the user regarding which robotic instrument to insert and where to insert the robotic instrument. To illustrate an example, system 300 may provide a text and/or graphical notification by way of display monitor 114 instructing assistant 110-2 to replace robotic instrument 204-2 shown in FIG. 13 with an additional grasping-type robotic instrument that is better suited to interact with non-robotic instrument 702. Based on the notification, assistant 100-2 may remove robotic instrument 204-2 from the surgical space and insert the additional grasping-type robotic instrument along a similar insertion trajectory as robotic instrument 204-2 shown in FIG. 13. In so doing, the additional grasping-type robotic instrument may be better positioned to interact with non-robotic instrument 702 than robotic instruments 204-1 and 204-3.

In certain examples, system 300 may be configured to provide a notification configured to inform a user of a computer-assisted surgical system regarding which robotic instrument is to be used to interact with a target object located in the surgical space. System 300 may provide such a notification in any suitable manner. For example, system 300 may provide an audible notification to a user (e.g., surgeon 110-1) notifying the user regarding the determined robotic instrument. Such an audible notification may be provided in any suitable manner. For example, an audible notification may include a "beep," playback of an audio clip with spoken language identifying the robotic instrument, and/or any other suitable audible notification.

Additionally or alternatively, system 300 may be configured to provide a visual notification configured to notify the user regarding which robotic instrument to use to interact with a target object. For example, system 300 may provide a blinking light and/or any suitable graphical object or augmented overlay for display to a user (e.g., surgeon 110-1 by way of user control system 104) that informs the user that a particular robotic instrument is to be used to interact with a target object.

Additionally or alternatively, system 300 may be configured to provide a haptic notification configured to notify the user regarding which robotic instrument to use to interact with a target object. Such a haptic notification may be provided in any suitable manner. For example, system 300 may cause one of the master controls of user control system 104 to vibrate to inform the user that a particular robotic instrument is to be used to interact with a target object. To illustrate an example, if system 300 determines that robotic instrument 204-3 shown in FIG. 13 is an optimal robotic instrument to be used to interact with non-robotic instrument 702, system 300 may cause the master control of user control system 104 associated with robotic instrument 204-3 to vibrate to notify surgeon 110-1 of such a determination.

In certain examples, system 300 may be configured to determine a position that a robotic instrument may assume to facilitate interaction with a target object, such as by determining a position that a robotic instrument is intended to assume to facilitate interaction with a target object. System may determine the position that a robotic instrument is intended to assume in any suitable manner, such as described herein. In certain implementations, system 300 may determine the position that a robotic instrument is intended to assume with respect to a target object without determining an orientation that the robotic instrument is intended to assume. Alternatively, system 300 may be configured to determine a pose that a robotic instrument is intended to assume to facilitate interaction with a target object.

A robotic instrument may be positioned with respect to a target object in a plurality of different poses within a surgical space. However, some poses of a robotic instrument may be more effective than others at facilitating interaction with a target object. Accordingly, system 300 may be configured to determine an optimal pose for a robotic instrument to assume to facilitate the robotic instrument interacting with a target object.

In certain examples, system 300 may be configured to determine a current pose of an object in a surgical space to facilitate system 300 performing operations such as those described herein. For example, the current pose of a target object in a surgical space may be determined based on a combination of depth data (e.g., provided in a depth map of a surgical space) and a determined orientation of the target object within in the surgical space. Exemplary ways that system 300 may determine a current pose of a target object are described herein.

The current pose of a robotic instrument may be determined by system 300 in any suitable manner. For example, the current pose of a robotic instrument may be determined based on kinematics information associated with the robotic instrument, the combination of depth data and a determined orientation of the robotic instrument, and/or some combination thereof. In certain examples, the pose that a robotic instrument is intended to assume may correspond to a grasp pose that is configured to facilitate the robotic instrument grasping a target object. Exemplary ways that system 300 may determine a pose that a robotic instrument is intended to assume to facilitate interaction with a target object will now be described.

In certain examples, the determining of the pose that a robotic instrument is intended to assume may include identifying information associated with a target object. For example, system 300 may determine the pose that the robotic instrument is intended to assume based on an intended use of the target object and/or a pose of the target object. In certain examples, system 300 may be configured to identify such information associated with the target object prior to determining the pose that the robotic instrument is intended to assume. For example, system 300 may first determine, in any suitable manner such as described herein, the 6D pose of the target object in the surgical space. Based on the determined 6D pose, system 300 may determine the pose that the robotic instrument is intended to assume in relation to the pose of the target object.

Figure 14:
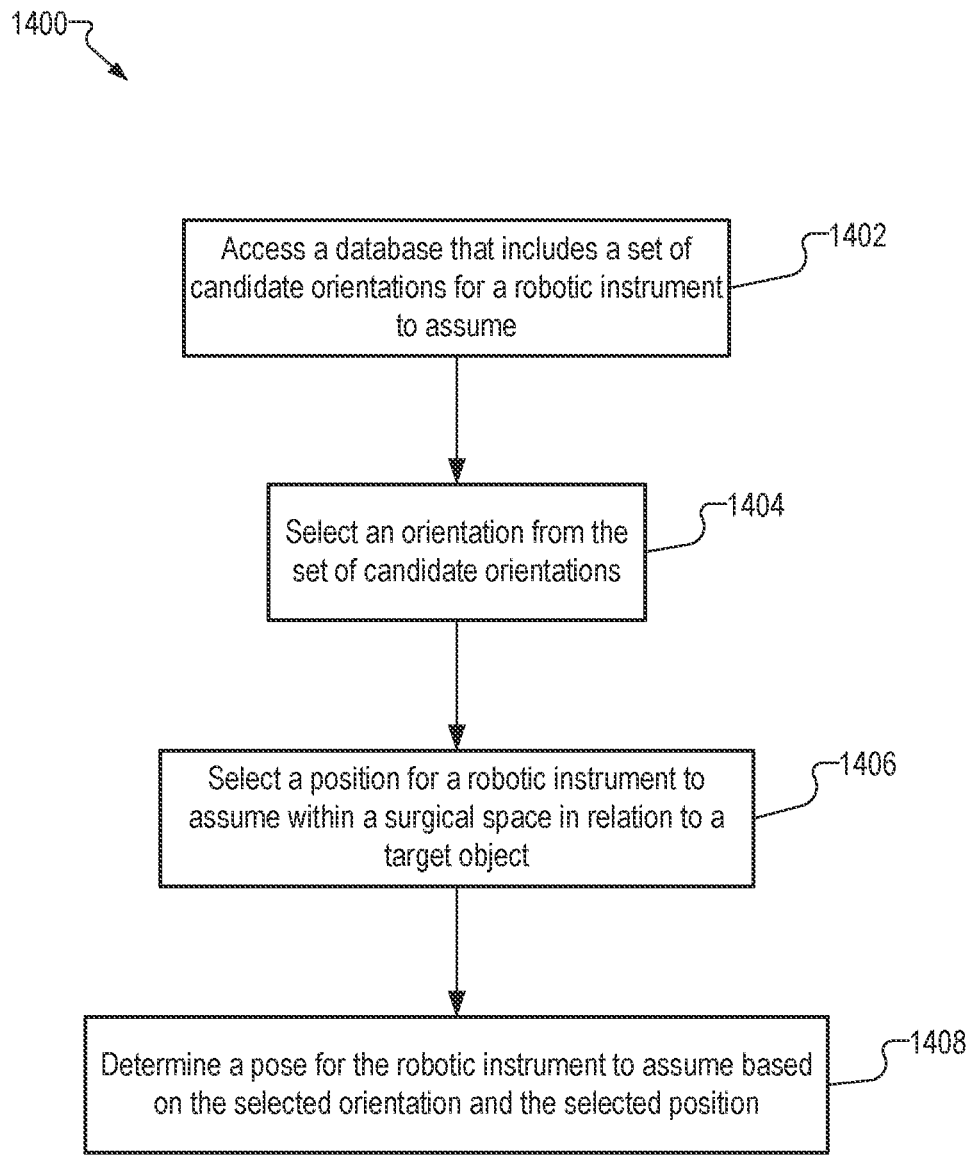
FIGS. 14 and 15 illustrate additional exemplary flow charts depicting various operations that may be performed by the system illustrated in FIG. 3 according to principles described herein.

System 300 may determine the pose that a robotic instrument is intended to assume to interact with a target object in any suitable manner. For example, FIG. 14 shows a flow chart 1400 that depicts exemplary operations that may be performed by system 300 when determining an intended pose of a robotic instrument. In operation 1402, system 300 may access a database that includes a set of candidate orientations for the robotic instrument to assume to facilitate the robotic instrument interacting with the target object. Such a database may include any suitable number of candidate orientations as may serve a particular implementation. In certain examples, the database may include a plurality of candidate orientations for each possible orientation that a target object may have in a surgical space. For example, a first orientation of a target object in a surgical space may be associated with a first candidate orientation, a second candidate orientation, and a third candidate orientation of a robotic instrument. A second orientation of a target object in the surgical space may be associated with a fourth candidate orientation, a fifth candidate orientation, and a sixth candidate orientation of the robotic instrument. In such examples, system 300 may determine the orientation of the target object in any suitable manner. System 300 may then select the corresponding candidate orientations from the database that are associated with the determined orientation of the target object as being possible orientations for a robotic instrument to assume. Such a database may be maintained by storage facility 304 and/or may be maintained by any suitable storage device accessible by system 300.

In operation 1404, system 300 may select an orientation from the set of candidate orientations included in the database, System 300 may select the orientation in any suitable manner. For example, system 300 may analyze a current pose (e.g., orientation and position) of a target object within the surgical space. Based on the current pose of the target object, system 300 may determine that the set of candidate orientations includes a first candidate orientation, a second candidate orientation, and a third candidate orientation that the robotic instrument may assume to facilitate interacting with the target object, System 300 may then select which of the first, second, or third candidate orientations of the robotic instrument included in the database is most conducive to the robotic instrument interacting with the target object. For example, system 300 may determine, in any suitable manner, that the first candidate orientation is easier for a user to achieve (e.g., based on the current orientation of the robotic instrument in the surgical space), results in a better interaction (e.g., a stronger grasp) with the target object, and/or results in better visibility in the surgical space than the second and third candidate orientations. Accordingly, system 300 may select the first candidate orientation as the orientation to be used for the robotic instrument to interact with the target object.

In operation 1406, system 300 may select a position for the robotic instrument to assume within the surgical space in relation to the target object. System 300 may select the position for the robotic instrument to assume in any suitable manner. For example, system 300 may analyze depth data associated with the surgical space to determine a relative pose within the surgical space of the target object and/or other objects (e.g., anatomy, other robotic instruments, etc.). Based on the depth data, the selected orientation that the robotic instrument is intended to assume, and/or any other suitable information, system 300 may select a position for the robotic instrument to assume while the robotic instrument is in the selected orientation.

In operation 1408, system 300 may determine the pose that the robotic instrument is intended to assume based on the selected orientation and the selected position.

In certain examples, system 300 may determine a pose that a robotic instrument is intended to assume based on a type of the target object located in the surgical space. To illustrate an example, non-robotic instrument 702 shown in FIG. 13 may correspond to a type of target object that is best grasped from a direction that is perpendicular to a lengthwise extension of non-robotic instrument 702. Accordingly, system 300 may select an orientation for robotic instrument 204-3 to assume that is perpendicular to the lengthwise extension of non-robotic instrument 702. In addition, the intended use of non-robotic instrument 702 may require maintaining visualization of the surface of kidney 704. Accordingly, system 300 may select the orientation of robotic instrument 204-3 so as to maximize viewability of the surface of kidney 704 during a surgical procedure (e.g., while robotic instrument 204-3 grasps and moves non-robotic instrument 702 within the surgical space). For example, the selected orientation and selected position may be provided on an upper side of non-robotic instrument 702 shown in FIG. 13 to maximize viewability of the surface of kidney 704.

Figure 15:
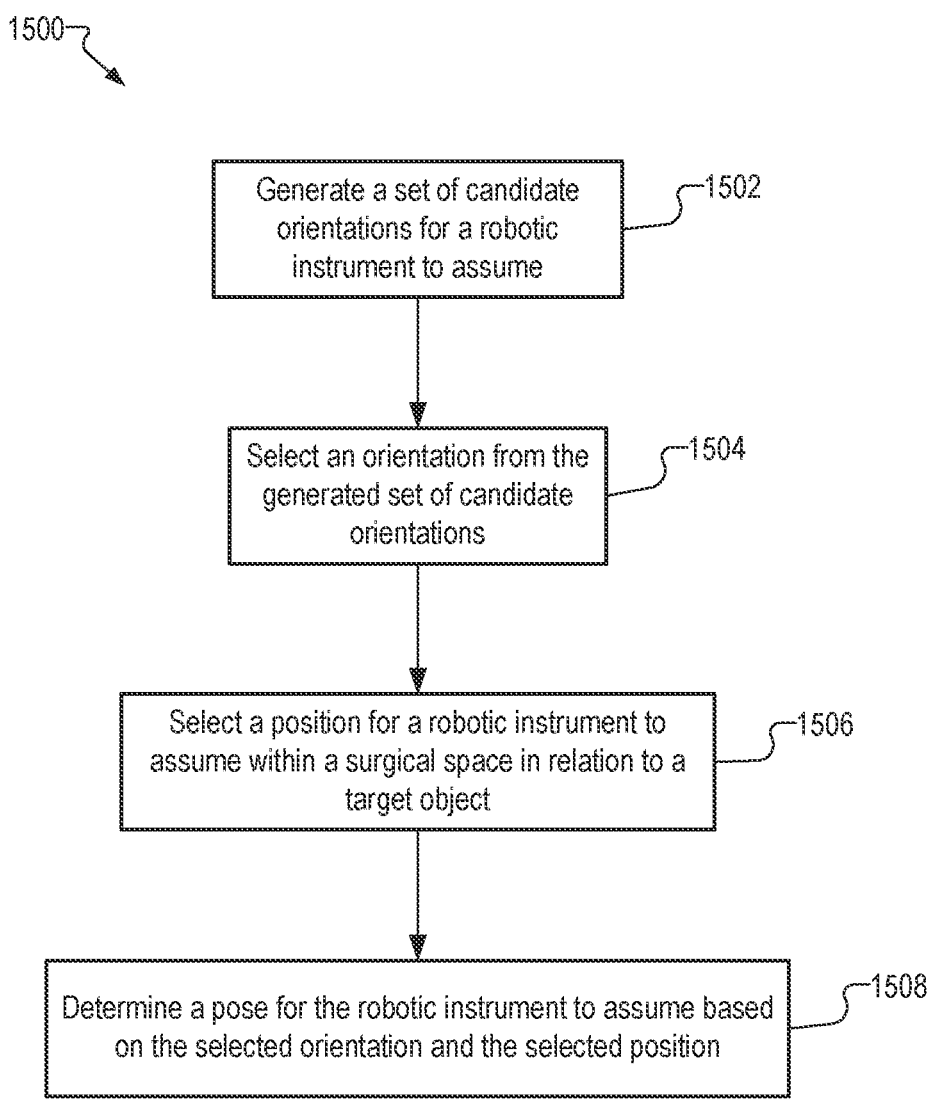

In certain examples, system 300 may be configured to generate a set of candidate orientations for a robotic instrument to assume to facilitate the robotic instrument interacting with a target object. FIG. 15 shows a flow chart 1500 that depicts exemplary operations that may be performed by system 300 when generating a set of candidate orientations. In operation 1502, system 300 may be configured to generate a set of candidate orientations for the robotic instrument to assume to facilitate the robotic instrument interacting with the target object. System 300 may generate the set of candidate orientations in any suitable manner. For example, in certain implementations, system 300 may use machine learning to generate the set of candidate orientations and/or perform any other operation described herein.

In certain examples, system 300 may use a supervised machine learning algorithm to generate a database of candidate orientations for a robotic instrument. In such examples, the training inputs to the supervised machine learning algorithm may include a plurality of images of a surgical space that include labeled orientations of robotic instruments in relation to target objects. System 300 may use the supervised machine learning algorithm in any suitable manner during a training phase to analyze the plurality of images of one or more surgical spaces with the labeled orientations of robotic instruments. After the training phase, system 300 may obtain, as an operational input, an image of a surgical space in which a target object is located. System 300 may use the supervised machine learning algorithm in any suitable manner (e.g., by using a deep neural network) to analyze the image of the surgical space including the target object and generate a set of candidate orientations. System 300 may determine, from the set of candidate orientations, an optimal orientation (e.g., an optimal class of orientations) for a robotic instrument to assume to interact with a target object. In certain alternative implementations, system 300 may use an unsupervised machine learning algorithm to perform any of the operations described herein.

In operation 1504, system 300 may select an orientation from the generated candidate orientations. System 300 may select the orientation in any suitable manner, such as described herein.

In operation 1506, system 300 may select a position for the robotic instrument to assume within the surgical space in relation to the target object. System 300 may select the position in any suitable manner, such as described herein.

In operation 1508, system 300 may determine the pose that the robotic instrument is intended to assume based on the selected orientation and the selected position.

In certain examples, it may be helpful for a user to visualize the pose that a robotic instrument is intended to assume prior to the robotic instrument being moved to the determined pose. Accordingly, in certain examples, system 300 may be configured to provide a representation of a robotic instrument in a determined pose for display to a user of a computer-assisted surgical system. As used herein, a "representation of a robotic instrument" may correspond to any suitable indicator that may be used to inform a user of a pose that a robotic instrument is intended to assume with respect to a target object. A representation of a robotic instrument may have any suitable shape, size, and/or visual appearance as may serve a particular implementation. For example, a representation of a robotic instrument may be transparent, translucent, opaque, colored, and/or patterned. In certain examples, a representation of a robotic instrument may have a 3D appearance when displayed on by a display device associated with a user. System 300 may be configured to provide such a representation of a robotic instrument for display in any suitable manner. For example, system 300 may provide the representation as a graphical overlay over an endoscopic view of the surgical space displayed to surgeon 110-1 by way of user control system 104.

Figure 16:
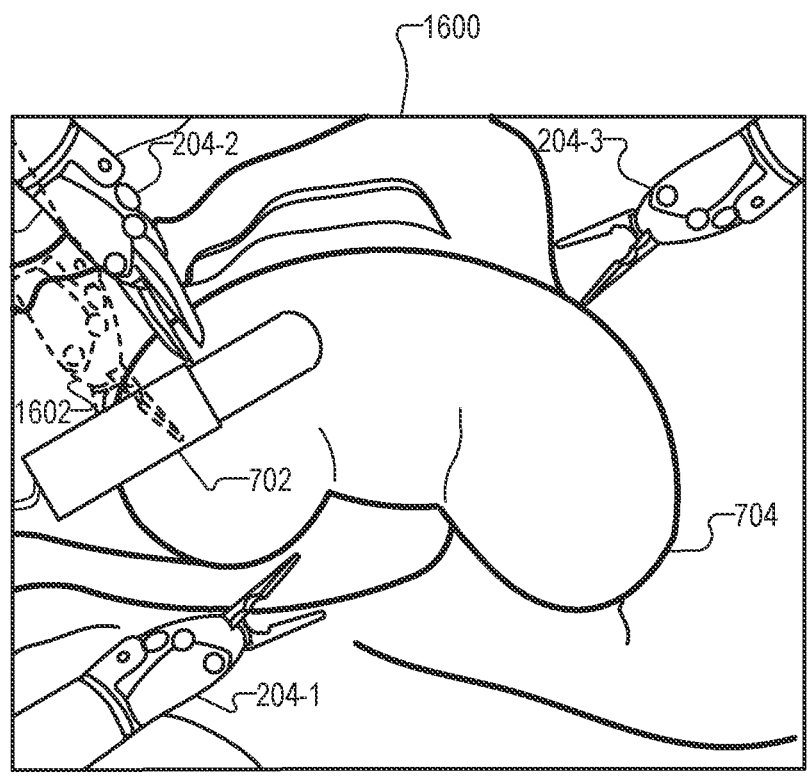
FIGS. 16-19 illustrate additional exemplary images of a surgical space according to principles described herein.

To illustrate an example, FIG. 16 shows an image 1600 of a surgical space in which non-robotic instrument 702 and robotic instruments 204-1 through 204-3 are provided in relation to kidney 704 of a patient (e.g., patient 108). As shown in FIG. 16, image 1600 also includes a representation 1602 that depicts an intended pose that, for example, robotic instrument 204-3 is to assume to facilitate robotic instrument 204-3 grasping non-robotic instrument 702. In the example shown in FIG. 16, representation 1602 is depicted as being visually similar to robotic instrument 204-3 except that representation 1602 is in dashed lines. However, it is understood that representation 1602 may have a different visual appearance than a robotic instrument in certain implementations. For example, in certain implementations, a representation of a robotic instrument may be more schematic in nature so as to have a different visual appearance than the robotic instrument. For example, a representation of a robotic instrument may be represented by a dotted or dashed line provided in a surgical space in certain implementations. Alternatively, a more schematic version of a representation of a robotic instrument may have a generic appearance (e.g., a rod-like appearance) in certain implementations.

After system 300 determines a position for a robotic instrument to assume, system 300 may facilitate the robotic instrument assuming the position. In certain examples, the facilitating of the robotic instrument assuming the position may include facilitating the robotic instrument assuming a pose. System 300 may facilitate the robotic instrument assuming the position or a pose in any suitable manner. For example, in certain implementations, system 300 may facilitate the robotic instrument assuming the position by generating a motion path for a robotic instrument to follow to assume a determined position. System 300 may generate a motion path in any suitable manner. For example, system 300 may determine, in any suitable manner, a current pose of a robotic instrument. System 300 may generate a motion path that starts at the current pose of the robotic instrument and that extends in any suitable path within the surgical space to the determined pose to be assumed by the robotic instrument. In certain examples, system 300 may generate a plurality of motion paths for a robotic instrument to follow to assume the determined pose. System 300 may then select an optimal motion path included in the plurality of motion paths for the robotic instrument to follow.

System 300 may leverage any suitable information associated with a surgical space to facilitate selecting an optimal motion path for a robotic instrument to follow. For example, system 300 may take into consideration a configuration of a computer-assisted surgical system, kinematic constraints of one or more manipulator arms of the computer-assisted surgical system, environmental constraints of a surgical space, and/or any other suitable information.

In certain examples, system 300 may select an optimal motion path based on a collision factor associated with a surgical space. A collision factor may represent any aspect associated with a surgical space that may affect how feasible it is for a robotic instrument to travel unimpeded along a candidate motion path. For example, a collision factor may include information associated with a position of anatomy with respect the motion path, information associated with a position of another robotic instrument and/or another object with respect to the motion path, etc. System 300 may determine that a particular motion path would result in a robotic instrument undesirably contacting anatomy and/or another object (e.g., another robotic instrument). Accordingly, system 300 may determine such a motion path is undesirable based on such collision factors.

Additionally or alternatively, system 300 may select an optimal motion path based on an economy of motion factor of a robotic instrument. An economy of motion factor may represent any aspect that defines how much a robotic instrument is to move in the surgical space to assume a given pose. For example, an economy of motion factor may include a distance that a robotic instrument is to travel to interact with a target object and/or an amount an orientation of a robotic instrument is to change to assume a particular orientation. For example, a first candidate motion path may result in the robotic instrument traversing a first distance across the surgical space and a second candidate motion path may result in the robotic instrument traversing a second distance across the surgical space. The first distance may be greater than the second distance. As such, system 300 may determine that the second candidate motion path is preferable to the first candidate motion path.

Additionally or alternatively, system 300 may select an optimal motion path based on a field of view factor of the surgical space. A field of view factor may be indicative of how much of a given motion path is viewable within a field of view of the surgical space at a given time. In such examples, a first candidate motion path that is fully within a current field of view of the surgical space may be favored over a second candidate motion path that requires a change of the field of view to view all or part of the second candidate motion path.

In certain examples, system 300 may determine that there is an obstruction in a motion path. Such an obstruction may correspond to any object that may block a robotic instrument from following a motion path. For example, an obstruction may include anatomy, another robotic instrument, and/or any other object in the surgical space. System 300 may determine that there is an obstruction in any suitable manner. For example, system 300 may determine that there is an obstruction by analyzing a depth map of the surgical space, kinematics associated with one or more robotic instruments in the surgical space, and/or any other suitable information.

If system 300 determines that there is an obstruction in a motion path, system 300 may perform an operation to facilitate removal of the obstruction from the motion path. To illustrate an example, image 1600 in FIG. 16 shows robotic instrument 204-2 being directly adjacent to representation 1602. Based on the position of robotic instrument 204-2, a motion path that, for example, robotic instrument 204-3 may follow to assume the pose indicated by representation 1602 may be obstructed by robotic instrument 204-2. Accordingly, system 300 may perform an operation to prevent robotic instrument 204-2 from obstructing the motion path. For example, system 300 may instruct a user (e.g., surgeon 110-1), in any suitable manner, to move robotic instrument 204-2 to a different location within the surgical space that does not obstruct the motion path. Alternatively, system 300 may instruct an additional user (e.g., assistant 110-2) to remove robotic instrument 204-2 from the surgical space.

In certain examples, system 300 may automatically perform an operation to remove an obstruction from a motion path. For example, system 300 may automatically reposition robotic instrument 204-2 within the surgical space such that robotic instrument 204-2 no longer obstructs a motion path associated with robotic instrument 204-3.

In certain examples, system 300 may establish a no-fly zone within a surgical space. Such a no-fly zone may correspond to an area of the surgical space where a robotic instrument is not allowed to travel, System 300 may establish such a no-fly zone due to visibility restrictions, obstructions due to other robotic instruments, obstructions due to anatomy, and/or for any other suitable reason. In such examples, system 300 may take into consideration the no-fly zone when determining an optimal motion path for a robotic instrument to follow to assume a pose.

In implementations where system 300 generates a motion path for the robotic instrument to follow, system 300 may facilitate a robotic instrument automatically following the generated motion path to assume a pose. In such examples, system 300 may direct a computer-assisted surgical system (e.g., system 100) to automatically move the robotic instrument along the motion path without requiring input from the user.

In certain implementations, system 300 may facilitate the robotic instrument automatically following the motion path with various levels of autonomy. For example, in certain implementations, system 300 may direct a computer-assisted surgical system to which the robotic instrument is attached to automatically move robotic instrument along the motion path and assume the identified pose. Alternatively, system 300 may direct the computer-assisted surgical system to which the robotic instrument is attached to automatically move the robotic instrument along the motion path to a vicinity of the determined pose. Once the robotic instrument is in the vicinity of the determined pose, a user (e.g., surgeon 110-1) may then assume manual control and fine positioning of the robotic instrument (e.g., by using master controls of user control system 104) to adjust the position and orientation of the robotic instrument such that the robotic instrument assumes the determined pose.

In examples where system 300 automatically controls a robotic instrument, system 300 may automatically cause the robotic instrument to assume an orientation associated with a determined pose at any suitable time. For example, system 300 may cause the robotic instrument to first assume the orientation associated with the determined pose and then automatically follow the motion path to a position associated with the determined pose. Alternatively, system 300 may automatically cause the robotic instrument to follow the motion path and then assume the orientation associated with the determined pose upon the robotic instrument reaching the position associated with the determined pose. Alternatively, system 300 may cause the robotic instrument to assume the orientation associated with the determined pose while the robotic instrument is following the motion path.

In certain alternative implementations, system 300 may be configured to facilitate a user (e.g., surgeon 110-1) of a computer-assisted surgical system to which the robotic instrument is attached moving the robotic instrument along the motion path. System 300 may facilitate the user moving the robotic instrument along the motion path in any suitable manner. For example, in certain implementations, system 300 may be configured to provide virtual guidance to facilitate a user moving a robotic instrument along a motion path. In certain examples, such virtual guidance may include system 300 providing haptic feedback guidance. Such haptic feedback guidance may be provided in any suitable manner. For example, such haptic feedback guidance may correspond to a virtual fixture such as a haptic tunnel in the surgical space that is configured to guide control of the robotic instrument along a motion path toward the determined pose. With such a haptic tunnel, as the user moves a robotic instrument along a motion path, system 300 may provide haptic feedback in the form of vibration of the master controls of user control system 104 whenever the user deviates from the motion path by more than some predefined threshold amount.

Additionally or alternatively, system 300 may be configured to provide audible guidance to facilitate a user moving a robotic instrument along a motion path. Such audible guidance may be provided in any suitable manner. For example, as the user moves a robotic instrument so as to follow a motion path, system 300 may provide audible guidance in the form of a "beep" noise or any other suitable noise whenever the user deviates from the motion path by more than some predefined threshold amount.

Figure 17:
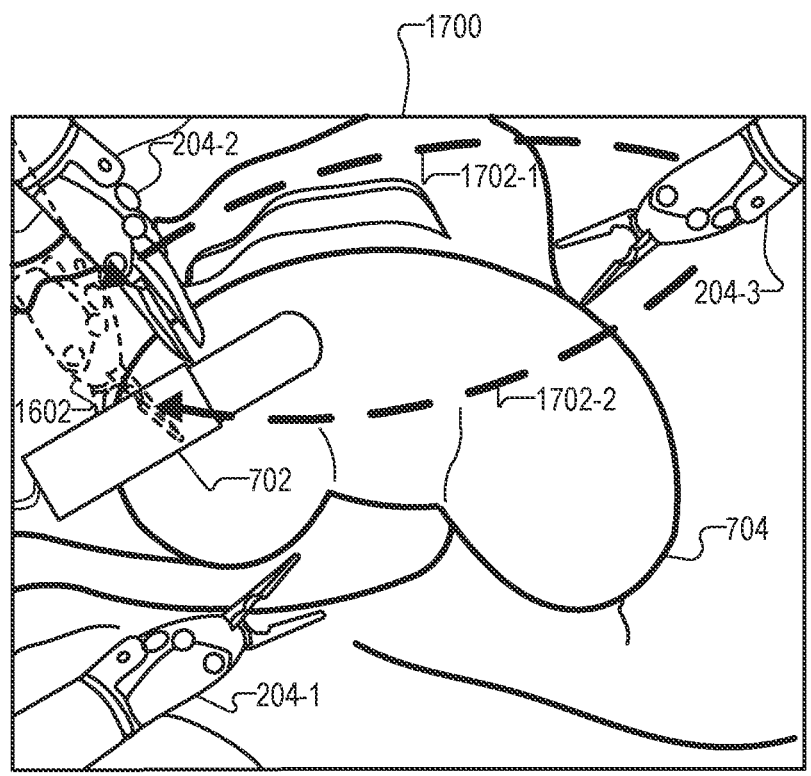

Additionally or alternatively, system 300 may be configured to provide visual guidance to assist a user in moving a robotic instrument along a motion path. Such visual guidance may be provided in any suitable manner. For example, such visual guidance may include a graphical depiction of the motion path. To illustrate an example, FIG. 17 shows an exemplary image 1700 of a surgical space where a surgical procedure is being performed with respect to a patient (e.g., patient 108). As shown in FIG. 17, image 1700 depicts non-robotic instrument 702 provided together with robotic instruments 204-1 through 204-3 in a surgical space that includes kidney 704 of the patient. As shown in FIG. 17, image 1700 also includes graphical depictions 1702 (e.g., graphical depictions 1702-1 and 1702-2) that show possible motion paths that robotic instrument 204-3 may follow to assume the pose depicted by representation 1602. In the example shown in FIG. 17, the user may select either the motion path represented by graphical depiction 1702-1 or the motion path represented by graphical depiction 1702-2 to assume the pose. If the user begins moving robotic instrument 204-3 along the motion path represented by graphical depiction 1702-1, system may automatically move robotic instrument 204-2 out of the way of the motion path represented by graphical depiction 1702-1. Alternatively, system 300 may provide a notification to the user informing the user that robotic instrument 204-2 is currently obstructing the motion path represented by graphical depiction 1702-1. System 300 may then instruct the user, in any suitable manner, to remove robotic instrument 204-2 from the motion path. On the other hand, if the user moves robotic instrument 204-3 along the motion path represented by graphical depiction 1702-2, the user may not have to initially move robotic instrument 204-2 prior to robotic instrument 204-3 assuming the pose.

Although FIG. 17 shows two graphical depictions 1702 of possible motion paths, it is understood that any suitable number of graphical depictions of motion paths may be provided for display to a user at a given time. For example, in certain implementations, only one graphical depiction of a motion path may be provided for display at a given time to a user. Alternatively, three or more graphical depictions of motion paths may be provided for concurrent display to a user in certain implementations.

In certain examples, system 300 may request that a user confirm that a motion path is acceptable prior to system 300 allowing a robotic instrument to follow the motion path to assume a determined pose. For example, system 300 may provide graphical depiction 1702-2 of the motion path for display to a user and playback an audio clip with the expression "please confirm that the motion path is acceptable." The user may then visually examine the motion path represented by graphical depiction 1702-2 to determine whether the motion path is free of obstructions and/or is otherwise acceptable. If the user determines that the motion path is acceptable, the user may provide any suitable response to audio clip. For example, the user may say "yes" out loud to indicate that the motion path represented by graphical depiction 1702-2 is acceptable. In such an example, system 300 may use any suitable speech recognition algorithm to detect the response of the user. System 300 may then facilitate robotic instrument 204-3 moving along the motion path in any suitable manner, such as described herein.

In certain examples, system 300 may generate one or more waypoints along a motion path to facilitate visualization of the motion path. System 300 may generate any suitable number of waypoints along a motion path as may serve a particular implementation. In certain examples, such waypoints may be provided for display to a user instead of or as part of a graphical depiction of a motion path. For example, graphical depiction 1702-1 and/or graphical depiction 1702-2 may each include a plurality of waypoints shown along the lengths thereof in certain implementations. Such waypoints may have any suitable size and/or shape (e.g., circle, square, triangle, etc.) as may serve a particular implementation.

In certain examples, waypoints such as those described herein may be provided by system 300 as part of a supervised autonomous movement of the robotic instrument along the motion path. For example, system 300 may facilitate a user confirming that a motion path is acceptable at each waypoint provided along a motion path as a computer assisted surgical system autonomously moves the robotic instrument along the motion path. In so doing, system 300 may receive real time confirmation from the user that a motion path is acceptable as a robotic instrument moves past each waypoint along the motion path. If there is a change in the surgical space that would affect the motion path (e.g., an obstruction is introduced after system 300 generates the motion path) as the robotic instrument moves along the motion path, system 300 may perform any suitable operation with respect to the change in the surgical space. In certain examples, system 300 may provide an augmented preview of a representation of the robotic instrument moving along the motion path to facilitate a user confirming that the motion path is acceptable.

In certain examples, system 300 may be configured to provide a notification to a user when a robotic instrument assumes a determined pose. Such a notification may be provided in any suitable manner. For example, system 300 may be configured to provide a visual notification, an audible notification, and/or a haptic feedback notification to a user when a robotic instrument assumes the determined pose. To illustrate an example, a user (e.g., surgeon 110-1) may control robotic instrument 204-3 so as to follow the motion path represented by graphical depiction 1702-2 shown in FIG. 17. At any suitable time during or after the movement of robotic instrument 204-3 to a position of representation 702, the user may rotate robotic instrument 204-3 so that the robotic instrument 204-3 assumes the orientation of representation 1602. When the position and orientation of robotic instrument 204-3 matches or is within some predefined threshold of the position and orientation of representation 1602, system 300 may provide, for example, an audio tone, a change the visual appearance (e.g., a change in color, pattern, etc.) of representation 1602, and/or haptic feedback in the form of vibration through the master controls of user controls system 104 to inform the user that robotic instrument 204-3 has assumed the pose and is ready to interact with (e.g., grasp) non-robotic instrument 702.

In certain examples, a target object such as a non-robotic instrument may include a protrusion provided on an outer surface of thereof to facilitate a robotic instrument grasping the target object. In examples were a protrusion is provided on an outer surface of a non-robotic instrument, system 300 may take into consideration a pose of the protrusion when determining the pose that a robotic instrument will assume to interact with the non-robotic instrument. Any suitable number of protrusions may be provided on an outer surface of a non-robotic instrument as may serve a particular implementation. For example, in certain implementations, two or more protrusions may be provided an outer surface of a non-robotic instrument. In such examples, a robotic instrument may be configured to grasp any one of the multiple protrusions to facilitate moving the non-robotic instrument in the surgical space. In addition, a protrusion of a non-robotic instrument may have any suitable size and/or configuration to facilitate a robotic instrument attached to a computer-assisted surgical system grasping the non-robotic instrument.

Figure 18B:
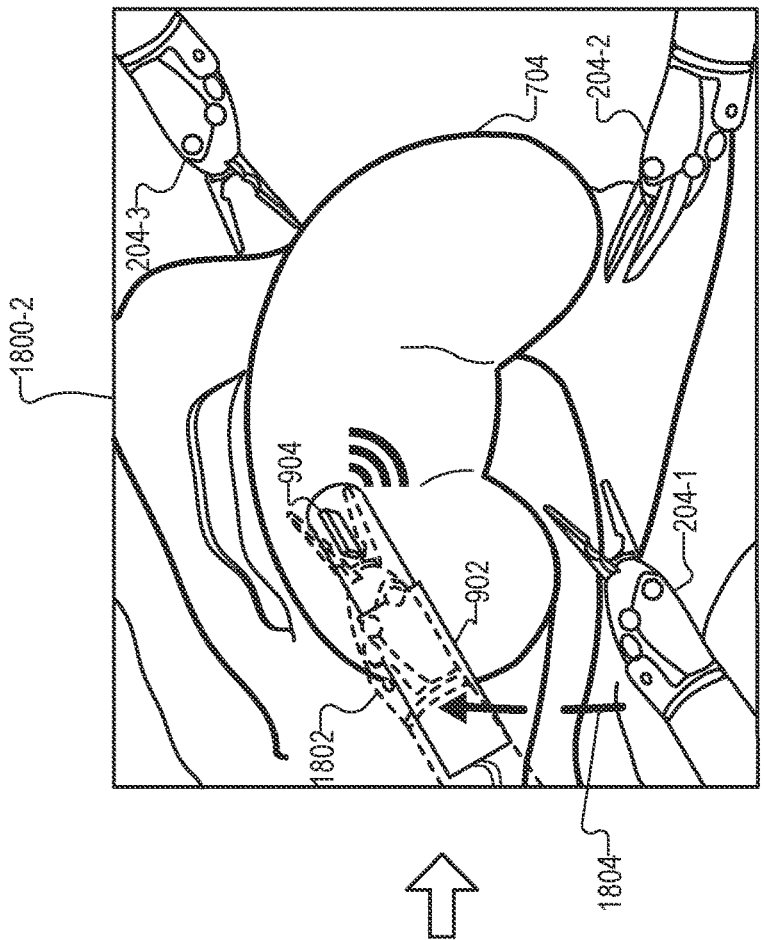
Figure 18A:
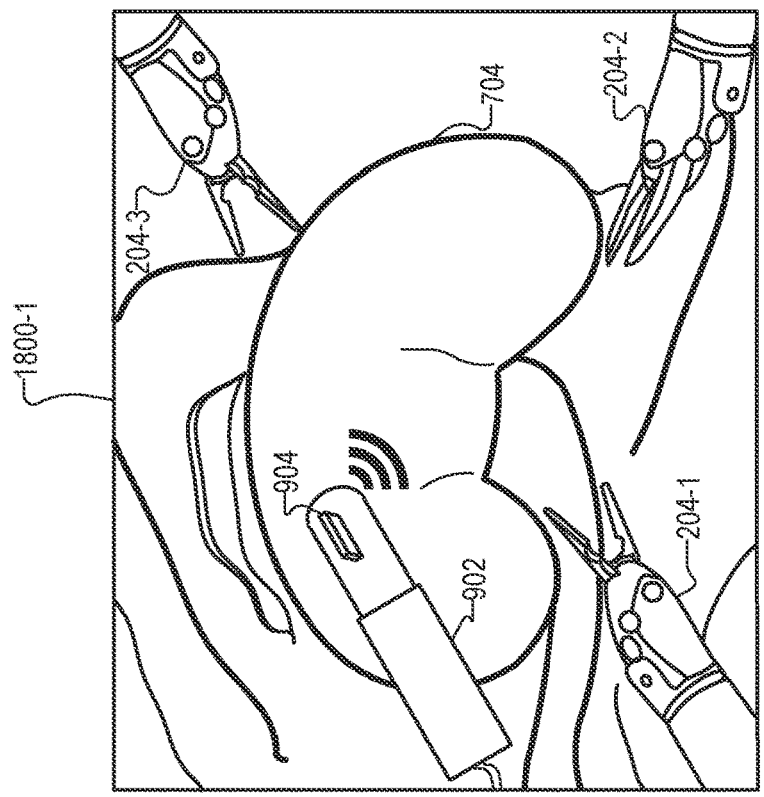

To illustrate, FIGS. 18A and 18B show exemplary images (e.g., images 1800-1 and 1800-2) of a surgical space in which drop-in ultrasound probe 902 is provided as a type of non-robotic imaging device within a surgical space. As shown in FIG. 18A, drop-in ultrasound probe 902 is provided together with robotic instruments 204-1 through 204-3 in a surgical space that includes kidney 704. Drop-in ultrasound probe 902 is configured to capture ultrasound images of sub-surface tissue of kidney 704. However, because drop-in ultrasound probe 902 is a non-robotic imaging device, a robotic instrument such as robotic instrument 204-1 must be used to grasp drop-in ultrasound probe 902 to adequately move drop-in ultrasound probe 902 in relation to kidney 704 to capture the ultrasound imagery. Accordingly, robotic instruments 204-1 and 204-3 are shown in FIGS. 18A and 18B as a grasper-type robotic instruments that are possible candidates to grasp and move drop-in ultrasound probe 902 within the surgical space.

As shown in FIGS. 18A and 18B, drop-in ultrasound probe 902 includes protrusion 204 on an outer surface that is configured to be grasped by one of robotic instruments 204. To facilitate one of robotic instruments 204 being used to grasp protrusion 904, system 300 may be configured to determine which robotic instrument 204 is best suited to be used to grasp protrusion 904. This may be accomplished in any suitable manner, such as described herein. For example, system 300 may determine the current poses of robotic instruments 204 in relation to the current pose of drop-in ultrasound probe 902. Based on the relative poses and/or any other suitable information, system 300 may determine that robotic instrument 204-1 is better suited to grasp protrusion 904 than robotic instrument 204-3. This may be due to various factors such as those described herein. For example, system 300 may select robotic instrument 204-1 based on an economy of motion factor because robotic instrument 204-1 is relatively closer to drop-in ultrasound probe 902 and is already in a similar orientation to drop-in ultrasound probe 902. System 300 may determine a pose for robotic instrument 204-1 to assume to facilitate robotic instrument 204-1 grasping protrusion 904. This may be accomplished in any suitable manner, such as described herein. System 300 may then facilitate robotic instrument 204-1 assuming the pose in any suitable manner, such as described herein.

For example, as shown in FIG. 18B, visual guidance in the form of a representation 1802 has been provided by system 300 to indicate the pose that robotic instrument 204-1 is intended to assume. In addition, a graphical depiction 1804 of an optimal motion path has been provided by system 300 to facilitate the user moving robotic instrument 204-1 along the optimal motion path. Through such visual guidance, a user (e.g., surgeon 110-1) can readily determine where to grasp drop-in ultrasound probe 902, an optimal pose (e.g., an optimal orientation and position) for robotic instrument 204-1 to assume to grasp drop-in ultrasound probe 902, and an optimal motion path along which to move robotic instrument 204-1 to grasp protrusion 904 of drop-in ultrasound probe 902.

While a robotic instrument grasps a target object, system 300 may perform an operation with respect to the target object. Such an operation may correspond to any suitable operation that may facilitate using a robotic instrument to interact with and/or facilitate use of the target object in the surgical space. For example, an operation that may be performed with respect to a target object may comprise, but is not limited to, system 300 facilitating a robotic instrument moving the target object while the robotic instrument grasps the target object and/or performing any other suitable operation.

Figure 19:
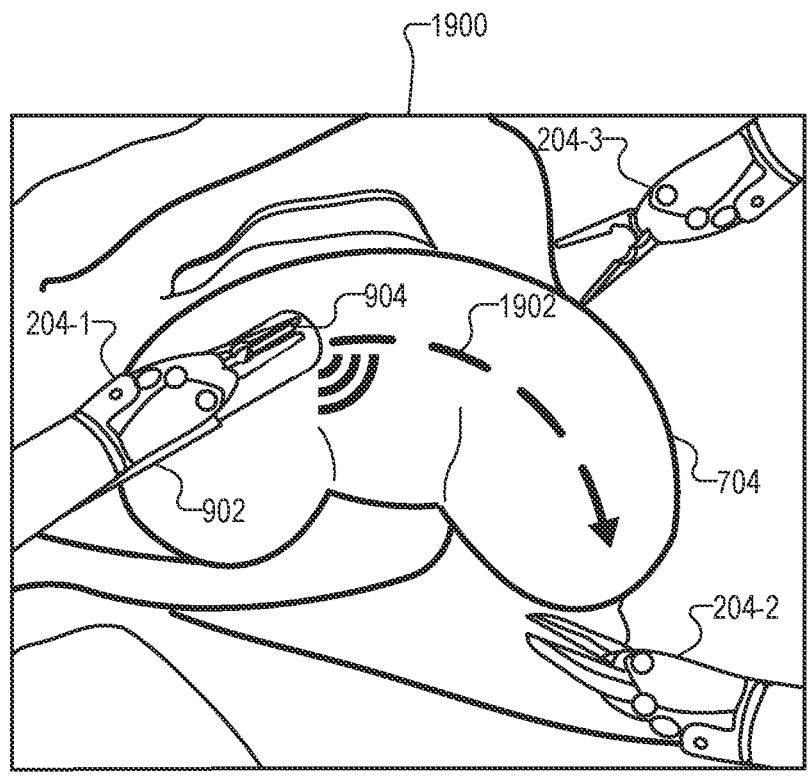

To illustrate an example, FIG. 19 shows an image 1900 of a surgical space in which robotic instruments 204-1 through 204-3 and drop-in ultrasound probe 902 are provided in relation to kidney 704. As shown in FIG. 19, drop-in ultrasound probe 902 is currently grasped by robotic instrument 204-1. As such, when a corresponding manipulator arm moves robotic instrument 204-1, drop-in ultrasound probe 902 also moves in relation to kidney 704. While drop-in ultrasound probe 902 is grasped by robotic instrument 204-1, robotic instrument 204-1 may move drop-in ultrasound probe 902 in any suitable manner along a surface of kidney 704 to capture ultrasound imagery of kidney 704. For example, FIG. 19 shows a detection path 1902 that robotic instrument may follow to facilitate capturing the ultrasound imagery.

In certain implementations, system 300 may direct a computer-assisted surgical system to automatically perform an operation to facilitate a user interacting with and/or using a target object. For example, exemplary systems such as any of those described herein may be configured to automatically use the robotic instrument to move the target object in any suitable manner within the surgical space, without requiring additional input from a user (e.g., surgeon 110-1). As such, in the example shown in FIG. 19, system 300 may automatically control robotic instrument 204-1 so as to move drop-in ultrasound probe 902 along detection path 1902 while surgeon 110-1 controls robotic instruments 204-2 and 204-3.

In certain alternative implementations, system 300 may be configured to assist a user in controlling a robotic instrument to move a target object within a surgical space. For example, system 300 may be configured to provide notifications regarding best practices for moving a robotic instrument with a grasped target object in a surgical space. System 300 may provide such instructions and/or notifications to a user in any suitable manner. For example, in certain implementations, system 300 may be configured to provide visual guidance to the user to assist the user in controlling the robotic instrument and a grasped target object. Such visual guidance may be provided in any suitable manner. For example, system 300 may provide graphical objects overlaid over an image (e.g., an image displayed by way of the stereoscopic image viewer of user control system 104) of the surgical space that is displayed to a user. To illustrate, detection path 1902 may be provided for display to a user as a graphical depiction of a suggested path for drop-in ultrasound probe 902 to follow in relation to kidney 704 to capture ultrasound imagery.

In certain examples, a current pose of a target object in a surgical space may not be conducive to interaction with a robotic instrument. Accordingly, in certain implementations, system 300 may be configured to perform an operation to facilitate changing the pose of the target object in the surgical space. In certain examples, such an operation may include system 300 automatically using a robotic instrument to change the pose of the target object. For example, system 300 may automatically grasp the target object and change the pose of the target object to a pose that is more conducive to interaction with a robotic instrument. In certain alternative implementations, such an operation to facilitate changing a pose of a target object may include providing an instruction to the user of a computer-assisted surgical system to change the pose of the target object in the surgical space. System 300 may instruct a user to change the pose of a target object in any suitable manner.

To illustrate an example, when a target object corresponds to a drop-in ultrasound probe, a protrusion (e.g., protrusion 904) on the outer surface of the drop-in ultrasound probe may not currently be visible in an endoscopic view of the surgical space. For example, the protrusion may be facing away from the endoscopic view and towards anatomy. Accordingly, it may be desirable to rotate the drop-in ultrasound probe such that the drop-in ultrasound probe is in a better orientation for grasping by a robotic instrument. In such an example, system 300 may instruct the user to, for example, manually twist a cord attached to the drop-in ultrasound probe to reposition the drop-in ultrasound probe. Alternatively, system 300 may instruct the user to use a robotic instrument to grasp and reposition the drop-in ultrasound probe in any suitable manner.

In certain examples, system 300 may automatically control an additional robotic instrument in the surgical space to facilitate a robotic instrument interacting with a grasped target object. For example, if robotic instrument 204-1 is currently grasping drop-in ultrasound probe 902, as shown in FIG. 19, system 300 may direct the computer-assisted surgical system to automatically control one or more of robotic instruments 204-2 and 204-3 in any suitable manner to facilitate use of drop-in ultrasound probe 902. As an example, system 300 may direct the computer-assisted surgical system to automatically move one or more of robotic instruments 204-2 and 204-3 from a position that would obstruct movement of drop-in ultrasound probe 902 in relation to kidney 704.

Additionally or alternatively, system 300 may direct the computer-assisted surgical system to automatically control a manipulator arm attached to imaging device 202 to facilitate interaction of a robotic instrument with a target object. For example, system 300 may direct a computer-assisted surgical system to automatically adjust a position and/or operation of imaging device 202 to facilitate a robotic instrument interacting with a target object. To illustrate an example, system 300 may generate a motion path for a robotic instrument to follow that extends, at least in part, out of a current field of view of the surgical space. In such an example, as a user moves the robotic instrument along the motion path, system 300 may direct the computer-assisted surgical system to automatically move imaging device 202 to ensure that the robotic instrument remains in the field of view as the robotic instrument travels along the entire length of the motion path.

Figure 20:
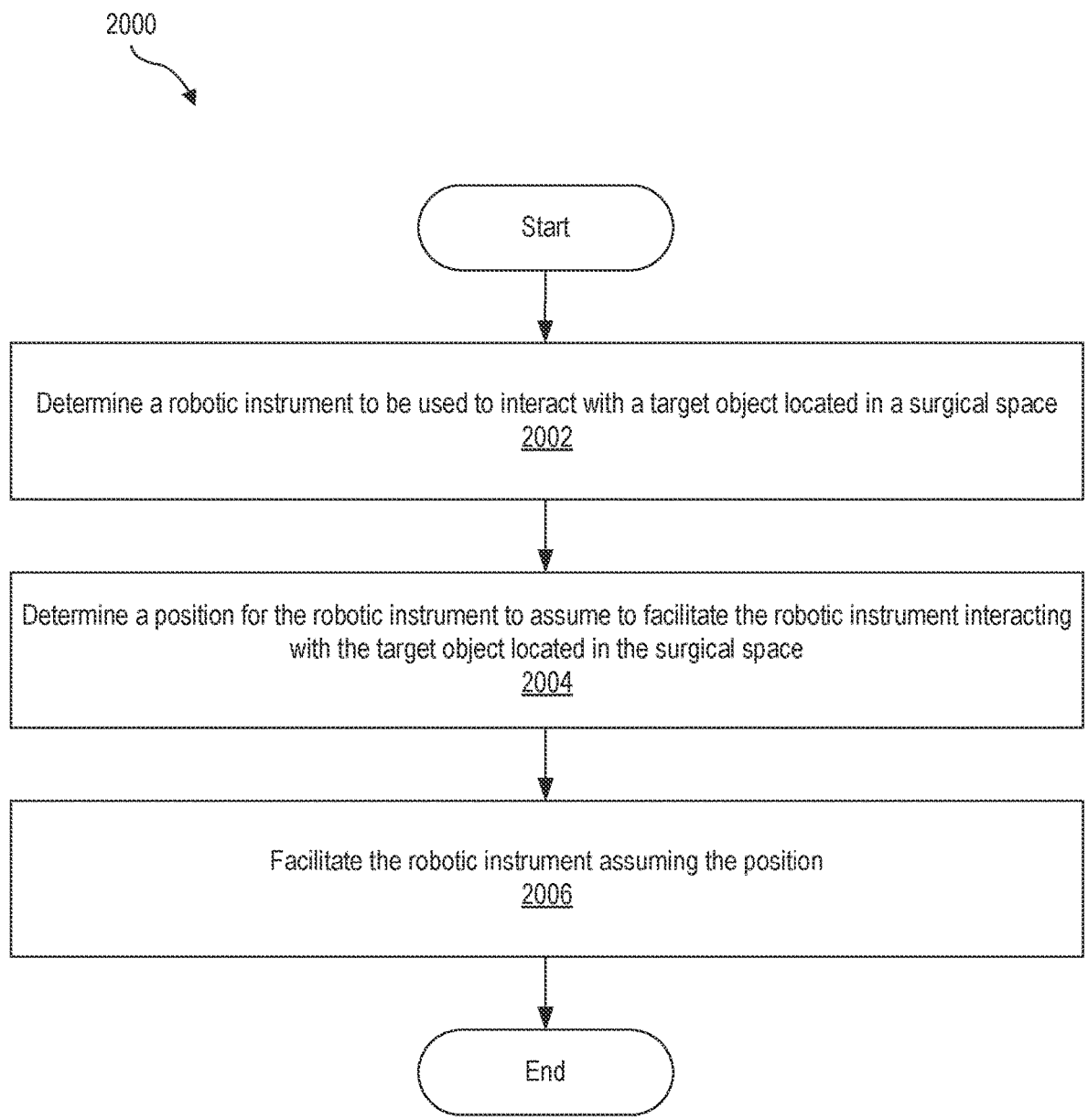
FIG. 20 illustrates an exemplary method for facilitating a robotic instrument interacting with a target object in a surgical space according to principles described herein.

FIG. 20 illustrates an exemplary method for facilitating a robotic instrument interacting with a target object in a surgical space. While FIG. 20 illustrates exemplary operations according to one embodiment, other embodiments may omit, add to, reorder, and/or modify any of the operations shown in FIG. 20, One or more of the operations shown in FIG. 20 may be performed by a system such as system 300, any components included therein, and/or any implementation thereof.

In operation 2002, a processor (e.g., a processor implementing processing facility 302) associated with a computer-assisted surgical system (e.g., surgical system 100) may determine a robotic instrument to be used to interact with a target object located in a surgical space. Operation 2002 may be performed in any of the ways described herein.

In operation 2004, the processor may determine a position for the robotic instrument to assume to facilitate the robotic instrument interacting with the target object located in the surgical space. Operation 2004 may be performed in any of the ways described herein.

In operation 2006, the processor may facilitate the robotic instrument assuming the position. Operation 2006 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to; RAM (e.g., dynamic RAM).

Figure 21:
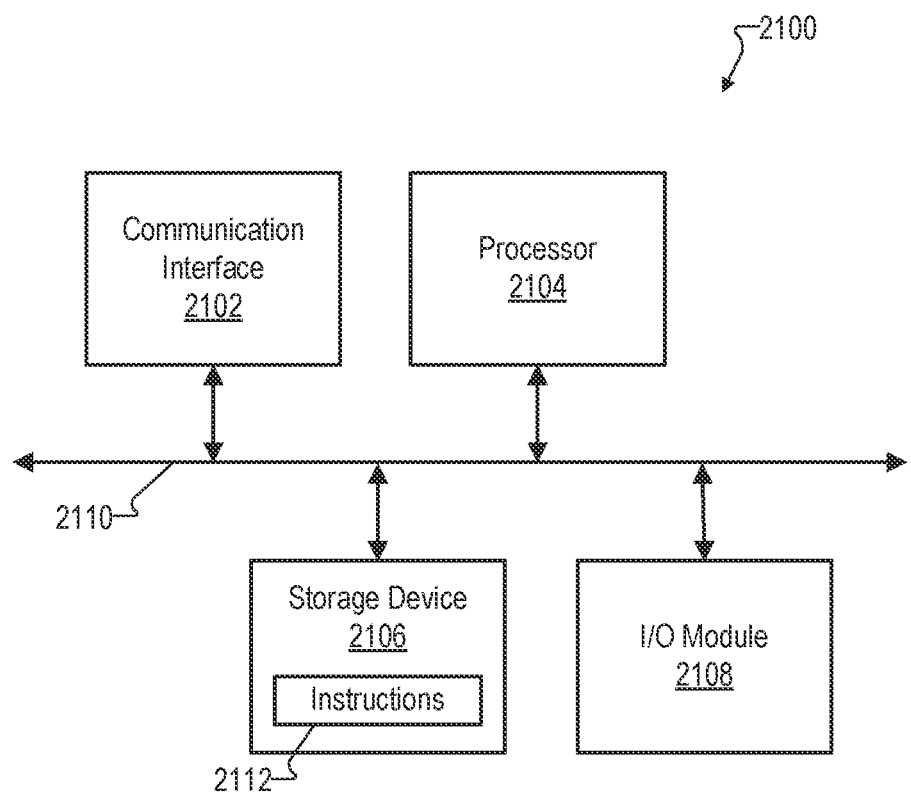
FIG. 21 illustrates an exemplary computing device according to principles described herein.

FIG. 21 illustrates an exemplary computing device 2100 that may be specifically configured to perform one or more of the processes described herein. As shown in FIG. 21, computing device 2100 may include a communication interface 2102, a processor 2104, a storage device 2106, and an input/output ("I/O") module 2108 communicatively connected one to another via a communication infrastructure 2110. While an exemplary computing device 2100 is shown in FIG. 21, the components illustrated in FIG. 21 are not intended to be limiting. Additional or alternative components may be used in other embodiments. Components of computing device 2100 shown in FIG. 21 will now be described in additional detail.

Communication interface 2102 may be configured to communicate with one or more computing devices. Examples of communication interface 2102 include, without limitation, a wired network interface (such as a network interface card), a wireless network interface (such as a wireless network interface card), a modem, an audio/video connection, and any other suitable interface.

Processor 2104 generally represents any type or form of processing unit capable of processing data and/or interpreting, executing, and/or directing execution of one or more of the instructions, processes, and/or operations described herein, Processor 2104 may perform operations by executing computer-executable instructions 2112 (e.g., an application, software, code, and/or other executable data instance) stored in storage device 2106.

Storage device 2106 may include one or more data storage media, devices, or configurations and may employ any type, form, and combination of data storage media and/or device. For example, storage device 2106 may include, but is not limited to, any combination of the non-volatile media and/or volatile media described herein, Electronic data, including data described herein, may be temporarily and/or permanently stored in storage device 2106. For example, data representative of computer-executable instructions 2112 configured to direct processor 2104 to perform any of the operations described herein may be stored within storage device 2106. In some examples, data may be arranged in one or more databases residing within storage device 2106.

I/O module 2108 may include one or more I/O modules configured to receive user input and provide user output. One or more I/O modules may be used to receive input for a single virtual experience. I/O module 2108 may include any hardware, firmware, software, or combination thereof supportive of input and output capabilities. For example, I/O module 2108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 2108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 2108 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 2100. For example, storage facility 304 may be implemented by storage device 2106, and processing facility 302 may be implemented by processor 2104.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
a memory storing instructions; and
a processor communicatively coupled to the memory and configured to execute the instructions to:
detect an intent of a user of a computer-assisted surgical system to use a robotic instrument attached to the computer-assisted surgical system to interact with a non-robotic instrument while the non-robotic instrument is located in a surgical space, wherein the non-robotic instrument is not directly attached to the robotic instrument but is movable within the surgical space by interaction with the robotic instrument;
determine a pose of the non-robotic instrument in the surgical space; and
perform, based on the detected intent of the user to interact with the non-robotic instrument and the determined pose of the non-robotic instrument in the surgical space, an operation with respect to the non-robotic instrument,
wherein the operation comprises providing an instruction to the user of the computer-assisted surgical system to assist the user in operating a user control console of the computer-assisted surgical system to instruct the computer-assisted surgical system to control the robotic instrument to move toward and engage with the non-robotic instrument, the instruction provided to the user prior to operation of the non-robotic instrument in the surgical space.

2. The system of claim 1, wherein:
the processor is further configured to execute the instructions to determine that the non-robotic instrument is located in the surgical space;
the detecting of the intent of the user to use the robotic instrument to interact with the non-robotic instrument is performed in response to the determining that the non-robotic instrument is located in the surgical space; and
the determining that the non-robotic instrument is located in the surgical space includes:
obtaining a depth map of the surgical space;
extracting a representation of an object from the depth map of the surgical space;
comparing the extracted representation of the object to a plurality of representations of known non-robotic instruments;
identifying, from the plurality of representations of known non-robotic instrument, a representation of a known non-robotic instrument that matches the extracted representation of the object; and
identifying the object as the non-robotic instrument based on the identified match.

3. The system of claim 1, wherein:
the non-robotic instrument includes a protrusion provided on an outer surface of the non-robotic instrument, the protrusion configured to be grasped by the robotic instrument attached to the computer-assisted surgical system; and
the determining of the pose of the non-robotic instrument includes determining a pose of the protrusion on the non-robotic instrument.

4. The system of claim 1, wherein the determining of the pose of the non-robotic instrument includes detecting an orientation of one or more markers provided on an outer surface of the non-robotic instrument.

5. The system of claim 1, wherein the determining of the pose of the non-robotic instrument includes:
accessing an image of the non-robotic instrument in the surgical space;
determining a representation of the non-robotic instrument from a viewpoint of an imaging device;
comparing the determined representation to a two-dimensional (2D) projection of a three-dimensional (3D) model of the non-robotic instrument that is oriented in a known orientation;
determining, based on the comparing of the determined representation to the 2D projection of the 3D model, a projection error between the determined representation and the projection of the 3D model; and
identifying the non-robotic instrument as being oriented in the known orientation when the determined projection error is less than a predefined threshold.

6. The system of claim 1, wherein the performing of the operation with respect to the non-robotic instrument further includes instructing the user of the computer-assisted surgical system to control the robotic instrument so as to grasp the non-robotic instrument with the robotic instrument.

7. The system of claim 6, wherein the processor is configured to provide at least one of visual guidance, audible guidance, or haptic feedback guidance to assist the user of the computer-assisted surgical system in controlling the robotic instrument to grasp the non-robotic instrument.

8. The system of claim 1, wherein:
the performing of the operation with respect to the non-robotic instrument further includes providing an instruction to the user of the computer-assisted surgical system to reposition the non-robotic instrument in the surgical space; and
the processor is further configured to execute the instructions to:
determine an updated pose of the non-robotic instrument in the surgical space; and
perform, based the determined updated pose of the non-robotic instrument in the surgical space, an additional operation with respect to the non-robotic instrument.

9. The system of claim 1, wherein the processor is further configured to execute the instructions to:
determine a position for the robotic instrument to assume to facilitate the robotic instrument interacting with the non-robotic instrument located in the surgical space; and
facilitate the robotic instrument assuming the position.

10. The system of claim 9, wherein:
the determining of the position for the robotic instrument to assume to facilitate the robotic instrument interacting with the non-robotic instrument includes determining a pose for the robotic instrument to assume to facilitate the robotic instrument interacting with the non-robotic instrument located in the surgical space; and
the facilitating of the robotic instrument assuming the position includes facilitating the robotic instrument assuming the pose.

11. The system of claim 10, wherein the determining of the pose for the robotic instrument to assume to facilitate the robotic instrument interacting with the non-robotic instrument located in the surgical space includes:
accessing a database that includes a set of candidate orientations for the robotic instrument to assume to facilitate the robotic instrument interacting with the non-robotic instrument;
selecting an orientation from the set of candidate orientations included in the database;
selecting a position for the robotic instrument to assume within the surgical space in relation to the non-robotic instrument; and
determining the pose based on the selected orientation and the selected position.

12. The system of claim 10, wherein the facilitating of the robotic instrument assuming the pose includes providing a representation of the robotic instrument in the determined pose for display to the user of the computer-assisted surgical system.

13. The system of claim 10, wherein the facilitating of the robotic instrument assuming the pose includes generating a motion path for the robotic instrument to follow to assume the pose.

14. The system of claim 13, wherein the generating of the motion path for the robotic instrument to follow to assume the pose includes:
determining that there is an obstruction in the generated motion path; and
performing an operation to facilitate removal of the obstruction from the generated motion path.

15. The system of claim 13, wherein:
the facilitating of the robotic instrument assuming the pose includes facilitating the robotic instrument following the motion path to assume the pose; and
the facilitating of the robotic instrument following the motion path to assume the pose includes facilitating a user of a computer-assisted surgical system attached to the robotic instrument moving the robotic instrument along the motion path.

16. The system of claim 15, wherein the facilitating of the user of the computer-assisted surgical system moving the robotic instrument along the motion path includes providing at least one of visual guidance, audible guidance, or haptic feedback guidance to assist the user in moving the robotic instrument along the motion path.

17. The system of claim 10, wherein the determined pose is a grasp pose that facilitates the robotic instrument grasping the non-robotic instrument.

18. A system comprising:
a memory storing instructions; and
a processor communicatively coupled to the memory and configured to execute the instructions to:
determine that a non-robotic instrument is located in a surgical space, wherein the non-robotic instrument is not directly attached to a robotic instrument of a computer-assisted surgical system but is movable within the surgical space by interaction with the robotic instrument;
determine, in response to the determining that the non-robotic instrument is located in the surgical space, a pose of the non-robotic instrument in the surgical space; and
facilitate, based on the determined pose of the non-robotic instrument in the surgical space, the robotic instrument, which is attached to the computer-assisted surgical system, interacting with the non-robotic instrument,
wherein the facilitating of the robotic instrument interacting with the non-robotic instrument comprises providing an instruction to a user of a computer-assisted surgical system to assist the user in operating a user control console of the computer-assisted surgical system to instruct the computer-assisted surgical system to control the robotic instrument to move toward and engage with the non-robotic instrument, the instruction provided to the user prior to operation of the non-robotic instrument in the surgical space.

19. A method comprising:
detecting, by a processor associated with a computer-assisted surgical system, an intent of a user of the computer-assisted surgical system to use a robotic instrument attached to the computer-assisted surgical system to interact with a non-robotic instrument while the non-robotic instrument is located in a surgical space, wherein the non-robotic instrument is not directly attached to the robotic instrument but is movable within the surgical space by interaction with the robotic instrument;
determining, by the processor, a pose of the non-robotic instrument in the surgical space; and
performing, by the processor based on the detected intent of the user to interact with the non-robotic instrument and the determined pose of the non-robotic instrument in the surgical space, an operation with respect to the non-robotic instrument,
wherein the operation comprises providing an instruction to the user of the computer-assisted surgical system to assist the user in operating a user control console of the computer-assisted surgical system to instruct the computer-assisted surgical system to control the robotic instrument to move toward and engage with the non-robotic instrument, the instruction provided to the user prior to operation of the non-robotic instrument in the surgical space.

* * * * *